(12) United States Patent
Vandenberg

(10) Patent No.: US 8,747,043 B2
(45) Date of Patent: *Jun. 10, 2014

(54) FASTENER, INSTALLATION TOOL AND RELATED METHOD OF USE

(71) Applicant: National Nail Corp., Grand Rapids, MI (US)

(72) Inventor: Roger A. Vandenberg, Hudsonville, MI (US)

(73) Assignee: National Nail Corp., Grand Rapids, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/908,820

(22) Filed: Jun. 3, 2013

(65) Prior Publication Data

US 2013/0266398 A1    Oct. 10, 2013

Related U.S. Application Data

(62) Division of application No. 12/908,549, filed on Oct. 20, 2010, now Pat. No. 8,480,343.

(60) Provisional application No. 61/294,681, filed on Jan. 13, 2010, provisional application No. 61/320,128, filed on Apr. 1, 2010.

(51) Int. Cl.
*F16B 25/00* (2006.01)

(52) U.S. Cl.
USPC .............. 411/386; 411/387.6; 411/387.7; 411/387.8; 411/413

(58) Field of Classification Search
USPC .......... 411/386, 387.6, 387.7, 411, 412, 413, 411/496; 408/227, 228, 230
See application file for complete search history.

(56) References Cited

U.S. PATENT DOCUMENTS

| 126,366 A | 4/1872 | Wills |
|---|---|---|
| 137,414 A | 4/1873 | Burdick |

(Continued)

FOREIGN PATENT DOCUMENTS

| CA | 1242601 | 10/1988 |
|---|---|---|
| CH | 695482 | 6/2006 |

(Continued)

OTHER PUBLICATIONS fiberon DeckPilot Mar. 2009.

(Continued)

*Primary Examiner* — Roberta Delisle
(74) *Attorney, Agent, or Firm* — Warner Norcross & Judd LLP

(57) ABSTRACT

A fastener including a chisel point that pre-bores a hole in a work piece to prevent damage to the work piece as the fastener advances. The fastener can include a head, a shaft and a chisel brake point formed at an end of the shaft. The chisel brake point can include first and second opposing inclined surfaces disposed at an angle of about 80° to about 150° relative to one another. A thread can begin adjacent the chisel brake point and form an extension of an inclined surface and/or a chisel edge. The chisel brake point can scrape material from a work piece while pre-boring a hole. The material can be transferred to the thread, and subsequently fed up the thread, out of the pre-bored hole. The chisel brake point can also selectively retard advancement of the fastener into the work piece. Methods of installing the fastener also are provided.

20 Claims, 17 Drawing Sheets

(56) References Cited

U.S. PATENT DOCUMENTS

| | | | |
|---|---|---|---|
| 138,784 A | 5/1873 | Bourn |
| 198,935 A | 1/1878 | Gilchrist |
| 411,202 A | 9/1889 | Rose |
| 877,831 A | 1/1908 | Creedon |
| 984,323 A | 2/1911 | Vauclain |
| 1,695,564 A | 12/1928 | Thomas |
| 2,083,092 A | 6/1937 | Richer |
| 2,229,565 A | 1/1941 | Hallowell, Jr. |
| 2,430,044 A | 11/1947 | Campsmith |
| 2,569,069 A | 9/1951 | Motel |
| 2,774,969 A | 12/1956 | Samples |
| 2,811,877 A | 11/1957 | Groff |
| 2,994,878 A | 8/1961 | Abrahamsen |
| 3,010,496 A | 11/1961 | Bruce |
| 3,012,247 A | 12/1961 | Sillars et al. |
| 3,080,185 A | 3/1963 | Walker |
| 3,115,168 A | 12/1963 | Acres |
| 3,147,484 A | 9/1964 | Nelson |
| 3,177,755 A | 4/1965 | Kahn |
| 3,207,023 A | 9/1965 | Knohl |
| 3,316,949 A | 5/1967 | Canfield |
| 3,357,295 A | 12/1967 | Smith |
| 3,360,176 A | 12/1967 | Gehl et al. |
| 3,489,041 A | 1/1970 | Hauenstein et al. |
| 3,633,640 A | 1/1972 | Moore |
| 3,707,043 A | 12/1972 | Jones |
| 3,738,218 A | 6/1973 | Gutshall |
| 3,942,405 A | 3/1976 | Wagner |
| 4,018,254 A | 4/1977 | DeCaro |
| 4,050,842 A | 9/1977 | Janin |
| 4,068,554 A | 1/1978 | Hirabayashi |
| 4,092,753 A | 6/1978 | Fuhrmann |
| 4,123,186 A | 10/1978 | Hoadley |
| 4,146,071 A | 3/1979 | Mueller et al. |
| 4,197,886 A | 4/1980 | MacDonald |
| 4,209,275 A | 6/1980 | Kim |
| 4,241,638 A | 12/1980 | Shimizu et al. |
| 4,287,923 A | 9/1981 | Hornung |
| 4,323,326 A | 4/1982 | Okada et al. |
| 4,329,095 A | 5/1982 | Schmuck |
| 4,329,099 A | 5/1982 | Shimizu et al. |
| 4,439,077 A | 3/1984 | Godsted |
| 4,572,038 A | 2/1986 | Graham |
| 4,572,720 A | 2/1986 | Rockenfeller et al. |
| 4,586,862 A | 5/1986 | Yamasaki |
| 4,611,515 A | 9/1986 | Marbourg, Jr. |
| 4,625,597 A | 12/1986 | Cast |
| 4,653,244 A | 3/1987 | Farrell |
| 4,834,602 A | 5/1989 | Takasaki |
| 4,995,768 A | 2/1991 | Craft |
| 5,015,134 A | 5/1991 | Gotoh |
| 5,019,080 A | 5/1991 | Hemer |
| 5,056,386 A | 10/1991 | Chaconas |
| 5,064,324 A | 11/1991 | Ragaller |
| 5,083,483 A | 1/1992 | Takagi |
| 5,123,311 A | 6/1992 | Dymek |
| 5,182,973 A | 2/1993 | Martindell |
| 5,188,496 A | 2/1993 | Giannuzzi |
| 5,282,708 A | 2/1994 | Giannuzzi |
| 5,322,396 A | 6/1994 | Blacker |
| 5,337,635 A | 8/1994 | Habermehl |
| 5,341,706 A | 8/1994 | Takagi |
| 5,351,586 A | 10/1994 | Habermehl et al. |
| 5,452,630 A | 9/1995 | Haas et al. |
| 5,465,492 A | 11/1995 | Bond |
| 5,469,767 A | 11/1995 | Habermehl |
| 5,509,330 A | 4/1996 | Nick |
| 5,531,142 A | 7/1996 | Adamo |
| 5,531,143 A | 7/1996 | Habermehl et al. |
| 5,568,753 A | 10/1996 | Habermehl et al. |
| 5,570,618 A | 11/1996 | Habermehl et al. |
| 5,687,624 A | 11/1997 | Tsuge et al. |
| D391,135 S | 2/1998 | Habermehl et al. |
| 5,839,332 A | 11/1998 | Fujiyama et al. |
| 5,871,486 A | 2/1999 | Huebner et al. |
| 5,884,541 A | 3/1999 | Habermehl et al. |
| 5,904,079 A | 5/1999 | Tsuge et al. |
| 5,918,512 A | 7/1999 | Habermehl et al. |
| 5,927,163 A | 7/1999 | Habermehl et al. |
| 5,934,162 A | 8/1999 | Habermehl |
| 5,988,025 A | 11/1999 | Sasaki et al. |
| 5,996,452 A | 12/1999 | Chiang |
| 6,027,004 A | 2/2000 | Ramella et al. |
| 6,089,132 A | 7/2000 | Habermehl |
| 6,098,442 A | 8/2000 | Waldorf et al. |
| 6,109,144 A | 8/2000 | Muro |
| 6,109,146 A | 8/2000 | Muro |
| 6,148,699 A | 11/2000 | Han |
| 6,158,939 A | 12/2000 | Grossberndt et al. |
| 6,244,140 B1 | 6/2001 | Habermehl |
| 6,296,433 B1 | 10/2001 | Forsell et al. |
| 6,322,307 B1 | 11/2001 | Glover |
| 6,328,516 B1 | 12/2001 | Hettich |
| 6,332,741 B1 | 12/2001 | Janusz |
| 6,334,748 B1 | 1/2002 | Gudjonsson |
| 6,345,940 B2 | 2/2002 | Anjanappa et al. |
| 6,349,948 B1 | 2/2002 | Wu |
| 6,394,712 B1 | 5/2002 | Weinstein et al. |
| 6,419,489 B1 | 7/2002 | Jorneus et al. |
| 6,425,306 B1 | 7/2002 | Habermehl |
| 6,439,085 B1 | 8/2002 | Habermehl et al. |
| 6,453,780 B2 | 9/2002 | Habermehl |
| 6,481,937 B1 | 11/2002 | Sommerfeld et al. |
| 6,499,221 B1 | 12/2002 | Kuhn et al. |
| D469,007 S | 1/2003 | Chen et al. |
| 6,514,026 B1 | 2/2003 | Gerhard |
| 6,592,015 B1 | 7/2003 | Gostylla et al. |
| 6,601,480 B1 | 8/2003 | Habermehl |
| 6,604,901 B1 | 8/2003 | Grossberndt et al. |
| 6,623,228 B1 | 9/2003 | Hettich et al. |
| 6,632,057 B1 | 10/2003 | Fauchet |
| 6,666,638 B2 | 12/2003 | Craven |
| 6,711,974 B1 | 3/2004 | Lin |
| 6,769,332 B2 | 8/2004 | Muro |
| 6,843,402 B2 | 1/2005 | Sims et al. |
| 6,887,023 B1 | 5/2005 | Lu et al. |
| 6,915,724 B2 | 7/2005 | Kigel et al. |
| 6,941,635 B2 | 9/2005 | Craven |
| 6,941,847 B2 | 9/2005 | Habermehl et al. |
| 7,037,059 B2 | 5/2006 | Dicke |
| 7,044,460 B2 | 5/2006 | Bolton |
| 7,090,453 B2 | 8/2006 | Lin |
| 7,096,768 B1 | 8/2006 | Chen |
| 7,124,665 B1 | 10/2006 | Chen |
| 7,156,600 B2 | 1/2007 | Panasik et al. |
| 7,165,481 B2 | 1/2007 | Kikuchi |
| 7,210,382 B2 | 5/2007 | McCracken |
| 7,231,854 B2 | 6/2007 | Kikuchi |
| D557,130 S | 12/2007 | Kashikura et al. |
| D557,131 S | 12/2007 | Liu |
| 7,306,396 B1 | 12/2007 | Chen |
| 7,344,057 B2 | 3/2008 | Dion et al. |
| D567,644 S | 4/2008 | Liu |
| 7,374,377 B2 | 5/2008 | Bauman |
| 7,383,756 B1 | 6/2008 | Liu |
| 7,387,054 B2 | 6/2008 | Rajotte |
| 7,424,840 B1 | 9/2008 | Huang |
| 7,454,996 B2 | 11/2008 | Hsu |
| D581,776 S | 12/2008 | Yin-Feng |
| 7,487,699 B2 | 2/2009 | Xu |
| D604,153 S | 11/2009 | Wantz |
| 7,682,118 B2 | 3/2010 | Gong et al. |
| 7,682,119 B2 | 3/2010 | Chen |
| 7,695,228 B2 | 4/2010 | Craven |
| D614,942 S | 5/2010 | Gaudron |
| 7,735,400 B2 | 6/2010 | Chen |
| 7,866,236 B2 | 1/2011 | Hsu |
| 7,891,275 B2 | 2/2011 | Huang |
| RE42,207 E | 3/2011 | Janusz |
| D634,186 S | 3/2011 | Kemper |
| D637,071 S | 5/2011 | Gaudron et al. |
| D637,896 S | 5/2011 | Dotsey |
| 7,950,312 B2 | 5/2011 | Matthiesen et al. |
| 7,992,469 B2 | 8/2011 | Chang et al. |

(56) References Cited

U.S. PATENT DOCUMENTS

| | | |
|---|---|---|
| D647,393 S | 10/2011 | Carrillo et al. |
| 8,123,524 B2 | 2/2012 | Anitua Aldecoa |
| 8,162,196 B2 | 4/2012 | Gasser et al. |
| 8,192,124 B2 | 6/2012 | Wolpert et al. |
| D662,808 S | 7/2012 | Vandenberg |
| D677,147 S | 3/2013 | Vandenberg |
| 2003/0235483 A1 | 12/2003 | Chen |
| 2004/0093997 A1 | 5/2004 | Huang |
| 2004/0141827 A1 | 7/2004 | Dicke |
| 2004/0175674 A1 | 9/2004 | Hurson |
| 2005/0265806 A1 | 12/2005 | Craven |
| 2005/0278934 A1 | 12/2005 | Orchard |
| 2007/0128001 A1 | 6/2007 | Su |
| 2007/0217887 A1 | 9/2007 | Lin |
| 2008/0025816 A1 | 1/2008 | Chen et al. |
| 2008/0080951 A1 | 4/2008 | Lin |
| 2008/0264218 A1 | 10/2008 | Wang et al. |
| 2008/0276761 A1 | 11/2008 | Hale et al. |
| 2008/0296341 A1 | 12/2008 | Francescon |
| 2009/0142159 A1 | 6/2009 | Wolpert et al. |
| 2009/0255386 A1 | 10/2009 | Liao |
| 2009/0314143 A1 | 12/2009 | Chen |
| 2010/0083610 A1 | 4/2010 | King |
| 2011/0167757 A1 | 7/2011 | Vandenberg |
| 2011/0170984 A1 | 7/2011 | Vandenberg |
| 2011/0232430 A1 | 9/2011 | Hale |
| 2012/0000327 A1 | 1/2012 | Park |
| 2012/0048909 A1 | 3/2012 | Gensmann et al. |
| 2012/0073410 A1 | 3/2012 | Hoffman et al. |
| 2013/0051955 A1 | 2/2013 | Su et al. |

FOREIGN PATENT DOCUMENTS

| | | |
|---|---|---|
| DE | 1077442 | 11/1955 |
| DE | 4228727 | 3/1994 |
| DE | 4331689 | 3/1994 |
| DE | 202008003131 | 10/2008 |
| DE | 202008011435 | 2/2009 |
| DE | 202009014890 | 5/2010 |
| DE | 202010006438 | 11/2010 |
| EP | 1260319 A2 | 11/2002 |
| EP | 1260319 A3 | 11/2002 |
| EP | 1260319 B1 | 11/2002 |
| EP | 1595627 | 11/2005 |
| EP | 1671752 A1 | 6/2006 |
| EP | 1671752 B1 | 6/2006 |
| EP | 1920890 | 5/2008 |
| EP | 1932623 | 6/2008 |
| EP | 1938928 | 7/2008 |
| EP | 2062690 | 5/2009 |
| EP | 2258518 | 12/2010 |
| EP | 2283977 | 2/2011 |
| EP | 2397706 | 12/2011 |
| EP | 2076362 | 3/2012 |
| FR | 2653046 | 4/1991 |
| GB | 191001226 | 12/1910 |
| GB | 167620 | 8/1921 |
| GB | 1009630 | 11/1965 |
| GB | 2127927 | 4/1984 |
| JP | 7217625 | 8/1995 |
| JP | 10329049 | 12/1998 |
| JP | 2000257616 | 9/2000 |
| JP | 2004308732 | 11/2004 |
| WO | 0037220 | 6/2000 |
| WO | 2006021026 | 3/2006 |
| WO | 2007091487 | 8/2007 |
| WO | 2011054328 | 5/2011 |

OTHER PUBLICATIONS fiberon DeckPilot Dec. 2009.

Kreg Jig downloaded from http://dregtool.com/products/pht/product.php?PRODUCT_ID=109.

Kreg Jig Jr. downloaded from http://kregtool.com/products/pht/product.php?PRODUCT_ID=32.

Kreg Micro Pocket Drill Guide downloaded from http://kregtool.com/products/pht/productphp?PRODUCT_ID=113.

Bostitch Miiifn—Hardwood Flooring Cleat Nailer downloaded from http://www.bostitch.com/defaultasp? Category=Flooring+Nailers &Type=Pro . . . .

FASTENER, INSTALLATION TOOL AND RELATED METHOD OF USE

BACKGROUND OF THE INVENTION

The present invention relates to fasteners, and more particularly to a side angled fastener, an installation tool and a related method of use.

There are a variety of commercially available fasteners that are designed to fasten a work piece, such as a wooden board or a composite element, to a substrate, such as a subfloor, joist or other underlying support structure. In many cases, these fasteners are in the form of threaded screws including: a large, bugle-shaped head to which an installation drive attaches (for example, a Phillips or star drive screw head); a shaft that projects from the head; threads on the shaft, and a conical, sharpened point, which centers the screw on a location, and initially pierces the board so that the screw can advance into it. These types of screws are typically drilled downward, in an orthogonal manner, into the top of a board to fasten the board to an underlying support, such as a joist. Most of the holding power of such screws come from the bugle-shaped head engaging the board.

Another type of screw includes the above features, that is, a large, bugle-shaped head that provides holding force, and a threaded shaft. However, instead of a sharpened conical point, these screws include a point having surfaces that meet at an acute angle between 15° and 35° to form a point. The acute angle of the surfaces enables the screw point to drill into a wood structure. While the acutely angled surfaces of such a screw can pre-drill a hole for the screw, the acutely angled surfaces also rapidly cut or drill into the wood. Accordingly, as soon as the first full threads engage the wood, they begin to quickly advance or feed the screw into the wood. This rapid advancement, caused by the threads twisting and subsequently thrusting the screw forward, sometimes leads to inadvertent splitting of the wood via a wedging action of the shaft and threads in the wood.

Recently, there have been developments in construction techniques and fastener technology that attach boards to a subfloor or underlying joist with screws, but that attempt to conceal the heads of those screws. This is achieved by advancing the screws at an angle through the sides of the boards, rather than the exposed upper surface or tops of the boards, and subsequently into an underlying support structure. When boards are placed side-by-side one another, these "side angled screws" are relatively unnoticeable by an observer looking straight down at the boards. Of course, at an angled view of the board, where portions of the sides of the boards may be visible, the screw heads may be somewhat visible, but usually not overly conspicuous.

An issue with conventional side angled screws concerns their configuration and the manner in which they advance into a work piece. Side angled screws typically include a conical, pointed tip. As soon as this pointed tip penetrates the board, the screw threads bite into the board, and rapidly draw the screw into the side of the board. As this occurs, the screw shaft is drawn between the grains or fibers or pieces of the board (depending on whether the board is constructed from wood or a composite). The drawing of the shaft between the grains or fibers frequently causes the lower corner of the board to splinter from the remainder of the board (if wooden) or to bulge out the lower corner of the board (if composite) due to the wedging action of the shaft and threads in the corner. Thus, conventional side angled screws can tend to damage the corner of the board into which they are advanced, particularly if they are imprecisely positioned or angled, or advanced too quickly into the board, or if the board is weak or dense. Typically, this will reduce the holding strength of the screw, which of course, is undesirable. Accordingly, there remains room for improving such fasteners.

To compliment side angled screws which include conical, pointed tips, certain tools have been developed to facilitate their installation. Generally, these tools include a jig, with a plate that sets atop a board to be fastened down, and a bore guide that generally aims the screw toward the side of the board into which the fastener is advanced. One specific tool includes a jig body that rests atop a board, a handle, and pins that extend downward from a flat bottom of the jig body, and that are configured to be positioned adjacent opposite sides of the board. The pins also position the fastened board a distance from the next adjacent board. The jig body bore guide is disposed at an angle, and generally aimed at a location that is intended to correspond to the side of a board. The bore, however, is located a distance away from the side of the board, generally above the pins, and terminates at the bottom of the jig body. Because the bore terminates at the jig body, its end is located above the upper or top surface of the board, which is a good distance from the location where the tip first engages the side of the board.

While this tool can be used to install pointed end screws, it suffers some shortcomings. For example, because the bore guide is distanced from the side of the board, screws advanced through the bore sometimes are placed improperly relative to the lower corner of the board. Accordingly, when the screw is advanced, it can split off the lower corner of the board. Further, if the tool is not perfectly aligned, the pointed tip of the screw sometimes can grab and pull the screw into the board at an undesirable angle, which can cause the screw to bind against the bore of the jig body and slow its advancement, or cause additional wear and tear on the guide.

In addition, while the pins of the aforementioned tool can help locate the bore guide, those pins can also be a detriment. For example, the boards usually used in projects are of varying widths. The pins of the tool are joined with the jig body in fixed positions. Sometimes, the spacing between the pins is such that it does not match the varying widths of the board. Accordingly, the tool might not fit properly over some overly wide, "outlier" boards in a particular project. Alternatively, where certain boards are overly narrow, the tool may improperly align the bore guide too far from the side of the board, so that the screw misses the board or splinters off its lower corner.

While conventional side angled screws and installation tools exist, there remains an long felt need for improvements to both the screws and the tools to better fasten down boards and other items with fasteners driven through the sides of the boards in a manner that generally conceals those fasteners.

SUMMARY OF THE INVENTION

A fastener including an end that pre-bores a hole for the remainder of the screw is provided. This fastener can be in the form of a screw that can be easily and consistently used in screwing operations where the fastener penetrates a surface of a work piece, such as a board or other building material, and optionally fastens the work piece or material to another work piece, article or underlying support structure.

In one embodiment, the fastener can be a screw, for example, a side angled screw, including a head attached to a body. The side angled screw can be adapted to be advanced into the side of a board at an angle. The head can include a drive feature that mates with a corresponding drive tool. The body can include a shaft, threads and an end.

In another embodiment, the screw can include an end that is generally "V" shaped. The end can include a chisel edge or point that is adapted to engage and scrape a surface of a work piece. Inclined surfaces can be opposed to one another across the chisel edge.

In yet another embodiment, the inclined surfaces can be disposed at an angle relative to one another, the chisel edge and/or a work piece into which the screw is advanced. Optionally, the inclined surfaces can be inclined at a negative rake angle when the end is engaged against a work piece. Further optionally, the inclined surfaces can be disposed at an obtuse angle relative to one another, for example, greater than 90° but less than about 180°, or about 135° to about 170°. Even further optionally, the inclined surfaces can be inclined at about 90°±10° relative to one another.

In still another embodiment, the screw end can be configured to scrape material from a work piece to pre-bore a hole for the remainder of the screw. Where included, the threads can auger the scraped material out from the hole to ensure there is sufficient room for the remainder of the screw to enter the hole without splitting or otherwise damaging the work piece adjacent the hole.

In even yet another embodiment, the screw end can include a thread that merges with at least one of the inclined surfaces associated with the chisel edge. The thread can include a leading portion that is located at or near the inclined surface, and that extends outwardly from an axis of the screw. The leading portion can engage and move chips or other material generated by the scraping action of the screw end, and subsequently auger that material up, along the thread. The leading portion optionally can form an extension of the chisel edge, with the thread beginning immediately adjacent the chisel edge.

In still yet another embodiment, the screw end can include a chisel brake point having at least two inclined surfaces disposed at an angle relative to one another. The screw end can act as a brake to retard the feed or advancement of the screw into a work piece for a preselected distance. Optionally, the braking action of the chisel brake point can be partially or fully overcome by threads on the screw engaging surrounding material of the work piece, where the threads eventually impart a forward advancing or feed force on the screw. When this occurs, the screw feeds or advances into the work piece at a faster feed rate.

In a further embodiment, the screw end including the chisel brake point can be configured for use with a screw that fastens a first work piece to a second work piece. The chisel brake point can retard advancement or feeding of the screw at least partially through the first work piece. When the screw has advanced into the first work piece a preselected distance, and optionally through the first work piece, the threads of the screw can engage the first work piece and increase the feed rate of the screw. Accordingly, the rate of advancement of the screw can change, due to the configuration of the screw (rather than a change in speed of a tool rotating the screw), with the braking action of the chisel brake point being reduced, and the rate of screw feed increasing in the first and/or second work piece.

In yet a further embodiment, a method is provided for using the screw including: providing a screw including a threaded shaft and an end, the end including a chisel edge and opposing inclined surfaces; constraining all but rotational and axial movement of the screw; engaging the screw against a work piece; rotating the screw so that the end scrapes material from the work piece surface; continuing to rotate the screw so that the end pre-bores a hole in the work piece into which the remainder of the screw enters; and continuing to advance the screw into the work piece, with the end continuing to scrape material from within the hole and the threads of the shaft augering the scraped material to eject material from the hole.

In still a further embodiment, a method is provided for installing a fastener, for example, a screw having a shaft, threads disposed on the shaft, and a chisel brake point located at an end of the fastener, into at least two work pieces. The method can include engaging the first work piece with the chisel brake point; advancing the fastener into and at least partially through the first work piece; retarding the advancement or feed rate of the fastener into and at least partially through the first work piece with the chisel brake point for a preselected distance; sufficiently engaging the threads of the fastener with the first work piece after the fastener is advanced the preselected distance, where the engagement of the threads increases the feed rate into and through at least one of the first work piece and the second work piece. Optionally, the engagement of the threads with the first work piece generates an advancement or feed force that is greater than a braking force of the chisel brake point, which braking force retards the feed of the fastener.

In still yet a further embodiment, an installation tool is provided. The tool can include a handle, a frame, and a tool screw guide or pilot element defining a screw bore that aligns a screw with a desired location on a work piece. The screw guide can prevent the screw from excessively wobbling as it rotates in the screw bore, relative to the work piece, so that the screw can be started in the surface of the work piece and advanced satisfactorily.

In another, further embodiment, the tool screw guide can include a spacer that extends downwardly from a body of the guide, and that sets a gap between adjacent boards or other construction materials joined with an installed screw. The screw bore can be defined at least partially within the spacer, so that the end of a screw is positioned and contained immediately adjacent the surface into which it is to be advanced.

In yet another, further embodiment, the tool guide can include a clamping mechanism that clamps the tool in place relative to a board or other construction element into which a screw is to be installed with the tool. The spacer can be a part of the clamping mechanism, and can move relative to the frame of the tool. The tool can include another spacer element distanced from the screw guide spacer. The distance can generally correspond to a width of a board or other construction element. The distance can be changed by moving the spacer relative to the spacer element sufficiently to clamp the board between these components. Accordingly, a screw installed with the tool can be precisely advanced into a surface of the board or other construction element.

In still another, further embodiment, the screw guide can include a material ejection port in communication with the screw bore. With this port, material scraped, extracted and/or removed from the hole produced by the screw can eject from the port, thereby preventing or impairing the material from hindering screw rotation within the tool.

The fastener described herein provides a simple and efficient structure that can pre-bore a hole for itself as it is advanced into a work piece. The fastener can be a screw that is easily advanced into a work piece at any angle, but optionally, the fastener is well suited to be advanced into the side of a work piece so that when installed, it is generally concealed from view from a viewer directly above the work piece. Where included, threads of the screw can auger material scraped by the screw out from the hole bored by the screw to promote efficient advancement of the screw and/or to prevent damage, such as splitting, of the work piece adjacent the hole and/or screw. Where included, the chisel edge brake point can selectively retard advancement or feed of the screw to prevent damage, such as splitting, of the work piece adjacent the hole and/or screw.

Further, the installation tool described herein can easily and consistently align a fastener with a desired surface of a work piece, and efficiently contain that fastener as it is rotated to prevent excessive wobble. The installation tool also can be securely and precisely joined with a work piece where it includes a clamping mechanism. This can promote accurate advancement of the fastener into the work piece. In addition, when a material ejection port is incorporated into the tool, it can facilitate dumping of material bored by the fastener out from a screw guide, which can prevent clogging of the guide, and impairment of fastener rotation.

These and other objects, advantages, and features of the invention will be more fully understood and appreciated by reference to the description of the current embodiment and the drawings.

DETAILED DESCRIPTION OF THE CURRENT EMBODIMENTS

Figure 1:
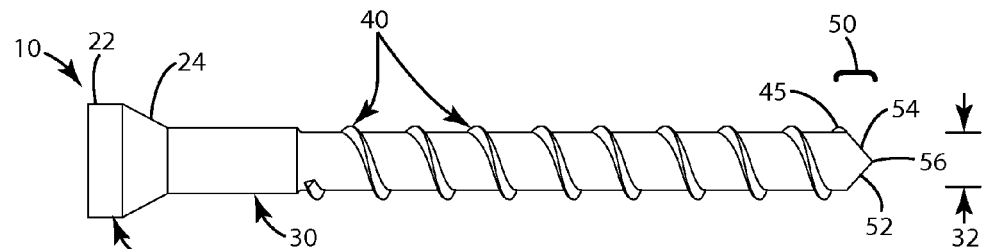
FIG. 1 is a side view of a current embodiment of a fastener.

A current embodiment of a fastener is illustrated in FIGS. 1-6 and generally designated 10. The fastener can be in the form of a threaded fastener, and more particularly, a screw 10 including a head 20 and a shaft 30. The head can include an upper portion 22 and a lower portion 24. The upper portion 22 can be of a uniform diameter 23 (FIG. 3), which can range from about 0.197 to 0.202 inches in diameter, or can be of other dimensions if desired. The upper portion 22 of the head can be generally cylindrical and of a uniform diameter from the end of the head where the opening to the drive feature is located, to where the upper portion 22 begins to transition to the lower portion 24, where it tapers down to the shaft 30 of the screw 10. Optionally, the lower portion can be in the form of a frustoconical portion.

The upper portion 22 of the head 20 can define a screw drive feature, such as a star drive, a Phillips head drive or any other suitable drive. The screw drive feature can define a hole 26 in the head, and can be compatible with any suitable drive feature, as noted above. Optionally, the hole 26 can be generally in the shape of a six-pointed star. The generic name of this type of drive feature is a star drive, or hexalobular internal drive feature, which is standardized by the International Organization for Standardization as ISO 10644. One optional type of star drive feature is a TORX drive, which drive comes in a variety of sizes, generally designated by a "T" and some number, such as T-10, T-15, and the like. TORX is a trade name of Textron, Inc. of Providence, R.I.

The particular drive and size of the hole 26 of the head 20 can vary, but as shown, it can be a T-15 size. The dimension from point-to-point of a T-15 hole in screw head can be about 0.128". The maximum torque range for such a head can be about 6.4 to about 7.7 Nm, as applied via a corresponding tool or head coupled within the hole. The hole 26 can be configured to accommodate a T-15 size TORX drive head. The hole 26 can be quite large, and thus the material 29 between the points of the hole and the outer diameter 23 of the head around the hole can be of a relatively small dimension. In some cases, the material between the outer diameter and the outermost portion of the points on the hole 26 can range from about 0.0325 to 0.035 inches. The hole 26 can be of a depth equal to, less than or greater than the depth 25 of the upper portion 22 of the head having the uniform diameter. Generally, the depth 25 of the upper portion can range from about 0.055 to 0.065 inches. Of course, where drive features, other than the optional T-15 drive are used, the dimensions of those features can widely vary depending on the application.

The drive feature can be connected to a rotary operated tool, such as a drill, that turns the head, and thus the screw 10, to advance the screw into a work piece as described in detail below. Optionally, the screw head can be of the same diameter as the shaft or smaller, or completely absent from the screw, with a drive feature simply included on or defined by the shaft 30 opposite the end 50.

Referring to FIG. 1, the shaft 30 of the screw 10 can be relatively cylindrical. The cylindrical portion can include threads 40 which protrude from it and wrap or coil around it. The threads can continue to the end 50 of the screw. Optionally, the threads can end or taper off a preselected distance from the end, for example 0.010" to about 0.5", or other distances as desired for the application. Further optionally, as described in the alternative embodiments below, one or more of the threads may be included in the end, possibly merging with and forming a portion of one or more inclined surfaces and/or the chisel edge. Even further optionally, the threads 40 can extend from the head 20 to the end 50 of the screw, depending on the application.

The threads can be configured at a particular pitch to theoretically provide a preselected feed rate of the screw into a work piece. For example, the threads may be pitched to provide a feed rate of about 1 to about 8 millimeters per full revolution of the screw about its longitudinal axis 200 (FIG. 5), also referred to as a screw axis. Other thread pitches can be selected to provide other desired theoretical feed rates.

Figure 2:
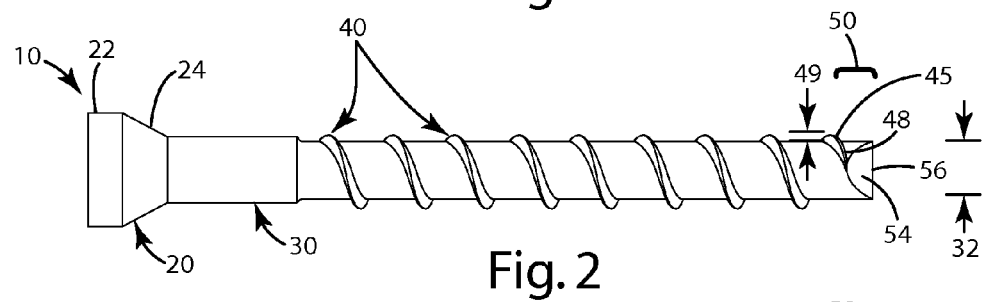
FIG. 2 is a second side view of the fastener.
Figure 3:
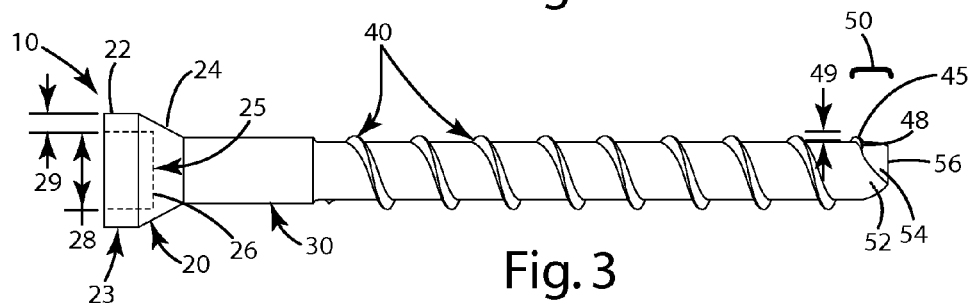
FIG. 3 is a third side view of the fastener.

The threads 40 can end at a last thread 45 as shown in FIGS. 1-5. The last thread 45 can terminate at a leading portion 48, which can have a thread height 49 (FIG. 2) that gradually decreases until it fades into the generally cylindrical portion of the shaft 30. Alternatively, although not shown, the last thread 45 can terminate abruptly, with the leading portion of the last thread having a thread height that is generally the same as the threads located above it on the shaft. With this configuration, the leading portion can terminate at a flat, beveled or sharpened forward surface as desired. Optionally, the location of the leading portion 48, and thus the end of the last thread 45 can vary relative to the chisel point 56. As shown in FIGS. 1-3, the leading portion 48 can terminate and fade or merge into the shaft 30 before the inclined surfaces 52 and 54 begin at the end 50, or at some other location relative to the inclined surfaces or chisel edge.

Figure 5:
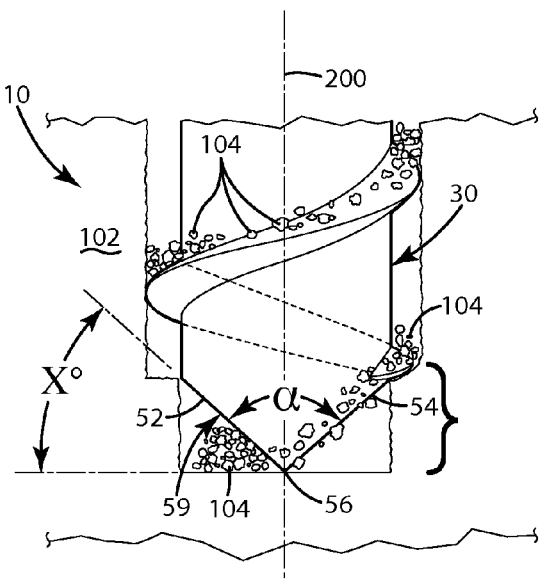
FIG. 5 is an enlarged side view of the end of the fastener engaging a work piece.

The leading portion 48 can end adjacent an apex of one of the inclined surfaces 54 as shown in FIGS. 3 and 5. If desired, however, the leading portion can terminate much farther up the shaft, away from the inclined surfaces, toward the head. Alternatively, the leading portion can terminate farther along the shaft, generally adjacent one of the inclined surfaces. Further, the leading portion can terminate the last thread somewhere between the opposing inclined surfaces 52 and 54, rather than at an apex or along some other portion of those surfaces. Other examples of the leading portion are presented in the alternative embodiments below.

Figure 4:
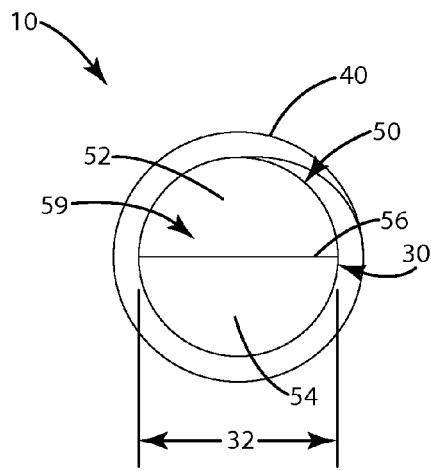
FIG. 4 is an end view of the fastener.

Returning to the end 50 of the screw in general, instead of being sharpened to a conical point (as with conventional screws), it instead can include a chisel edge 56 which includes inclined surfaces 52 and 54 diverging rearwardly from the chisel edge in a V-shaped configuration as seen in the side view of FIGS. 1, 4 and 5. The inclined surfaces 52 and 54 can be at a variety of angles relative to the longitudinal axis 200, for example 25°, 35°, 45°, 55°, 65°, 70°, 80°, or any angles therebetween that are suitable for the desired application. Optionally, the inclined surfaces 52 and 54 can be inclined at the same or different angles relative to the longitudinal axis 200.

Further optionally, the inclined surfaces 52 and 54 can be disposed at an obtuse angle α relative to one another as shown in FIG. 5. The obtuse angle can be any obtuse angle greater than 90° but less than 180°. Nonlimiting examples of ranges of suitable obtuse angles can have a lower limit of about 91°, 95°, 100°, 105°, 110°, 115°, 120°, 125°, 130°, 135°, 140°, 145°, 150°, 155°, 160°, 165°, 170°, 175°, and 179°; and a corresponding upper limit of 179°, 175°, 170°, 165°, 160°, 155°, 150°, 145°, 140°, 135°, 130°, 125°, 120°, 115°, 110°, 105°, 100°, 95°, and 91°. Several further exemplary ranges are between about 135° and about 170°, between about 145° and 160°, and about 130.

Although shown as generally planar elements, the inclined surfaces 52 and 54 can include surfaces that are slightly curvilinear. For example, the inclined surfaces can be slightly concave or convex, or even wavy or serrated depending on the application. As a result, the chisel edge located where the inclined surfaces meet can likewise be curvilinear, for example, concave or convex. Where the inclined surfaces are generally planar, the chisel edge can be substantially linear.

As shown in FIGS. 2 and 4, the chisel edge 56 and corresponding inclined surfaces 52 and 54 can extend outwardly to an outer diameter 32 of the shaft 30. The inclined surfaces 52 and 54 can be diametrically and symmetrically opposed to one another about the chisel edge 56, and/or the axis 200. In such a configuration, the chisel edge 56 can lie along a line that bisects the outer circumference of the shaft, and can be of the same length as the diameter of the shaft. As illustrated in FIGS. 1 and 2, the chisel edge 56 can extend substantially linearly from one side of the outer diameter 32 of the shaft 30 to the other side of the diameter 32 of the shaft 30, and/or in a transverse manner across a majority of the diameter of the shaft 30 in any desired location.

Optionally, the chisel edge 56 can be offset a preselected distance from the diameter of the shaft. In which case, the inclined surfaces 52 and 54, while being opposed to one another across the chisel edge 56, might not be symmetric. For example, one of the inclined surfaces might be of a larger surface area than the other. The chisel edge and the respective inclined surfaces, or generally the end 30, can be void of any cutting edges that effectively cut into a surface of a work piece against which the end is engaged. Instead, as shown, the end can be configured to scrape the surface against which it is engaged when being advanced by a tool, and to act as a brake to retard advancement or feed of the screw into a work piece, as further explained below. Of course, depending on the application, one or more true cutting surfaces might be incorporated into the end 50.

Generally, the screw end 50 can include a chisel brake point 59, which as used herein, means that the end includes at least two inclined surfaces 52 and 54 disposed at an angle α relative to one another, where the end 50 functions as a brake to selectively retard advancement or feed of the screw 10 into and/or at least partially through a work piece. In some embodiments, the angle α can be about 85° to about 95°, optionally about 90°, further optionally an obtuse angle, and even further optionally, any of the angles noted in connection with the other embodiments herein. Further, although referred to as a "point," the actual structure of the chisel brake point can include an edge, rather than a true point, that is formed at the intersection of the two or more inclined surfaces. Optionally, the edge extends along a diameter, a chord or other transverse dimension of the shaft 30 and or end 50 of the fastener 10.

One mode of operation of a specific embodiment of the screw 10 and its end 50 will now be described with reference to FIGS. 5 and 6. When advanced into a work piece 102, the screw 10 rotates in the direction of the arrow 101. With such rotation, the inclined surface 52 can form a rake angle, specifically a negative rake angle X°, which indicates that X° is less than or equal to 90°, which corresponds to the angle α being 90° or an obtuse angle. Thus, when the screw 10 is rotated as illustrated by the arrow 101, the inclined surface 52 (having the negative rake angle) and/or the chisel edge 56 forcibly scrapes the surface of the work piece 102 due to drag and friction. As a result, the chisel edge 56 and respective inclined surfaces remove material 104 from the surface of the work piece 102 (or the bottom of the hole) via a scraping action. The amount of scraping can be increased or decreased based on the amount of force which is applied along the longitudinal axis 200 by a tool or user.

On the opposite side of the chisel edge 56, the inclined surface 54 also forms a negative rake angle, which can be the same as or different from the rake angle X° of the inclined surface 52. This inclined surface 54 and/or the chisel edge 56 can scrape and remove material 104 from the work piece as described in connection with the other inclined surface.

Generally, without a tool to hold the screw 10 on the fixed axis 200, rotation of the screw 10 and the chisel edge 56 may cause the screw 10 to wobble uncontrollably against the work piece, making it difficult to advance the screw 10 into and/or through a desired location on the work piece. This can occur particularly in instances where the screw 10 is installed as a side angled screw, generally in a non-orthogonal manner into a surface of a work piece. Accordingly, an installation tool 70 as described herein is suitable for installing the screw 10 in a variety of work pieces.

Figure 6:
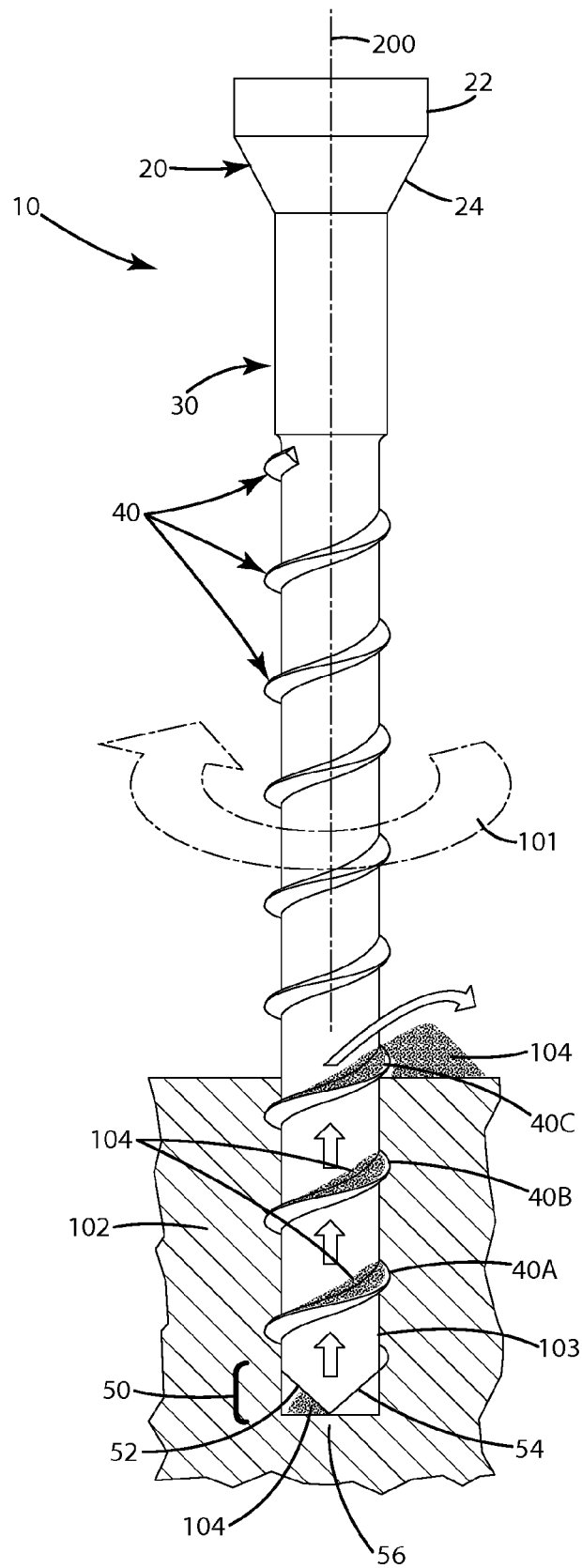
FIG. 6 is a side view of the fastener engaging a work piece.

Advancement or feed of the screw 10 into a work piece 102 can be further understood with reference to FIG. 6. As shown there, with the configuration of the screw end 50, and in particular, the chisel edge 56, the end 50 of the screw scrapes material 104 from the hole 103 which can be created by the scraping action of the end 50 within the work piece 102. The material 104 subsequently scraped from the bottom of the hole 103 can be augered upward, or otherwise away from the end 50, by the threads 40a, 40b, 40c (which can be part of the continuous thread 40) of the fastener 10 until the material is ejected from the hole, beyond the surface of the work piece 102.

Thus, in the embodiment of FIG. 6, the screw not only scrapes a hole in the work piece 102, but also removes the material from the hole so that the screw in effect can be threaded into a pre-bored hole (pre-bored by the screw end 50 and chisel edge 56) defined by the work piece. The scraping action of the end 50 can prevent the shaft 30 and threads 40 of the fastener from advancing or feeding too quickly into the work piece or otherwise advancing in a manner that will split the work piece into which it is drawn.

Figure 8:
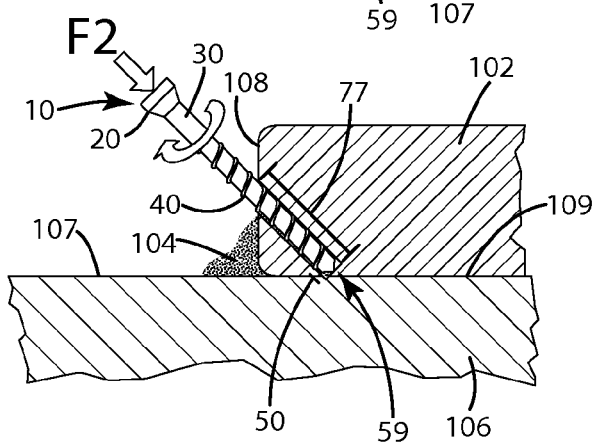
FIG. 8 is a second side view of the fastener advancing into the first work piece.
Figure 9:
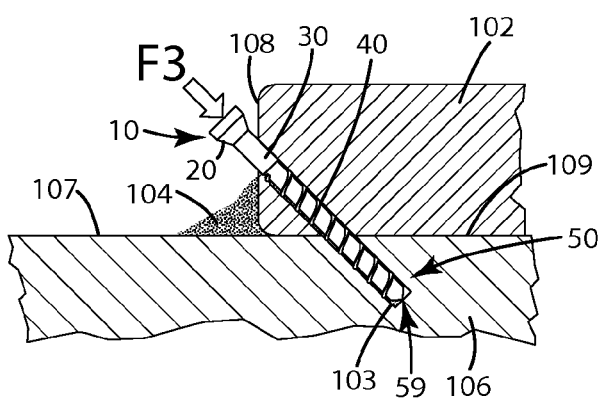
FIG. 9 is a third side view of the fastener as it further advances into the first and second work pieces.
Figure 10:
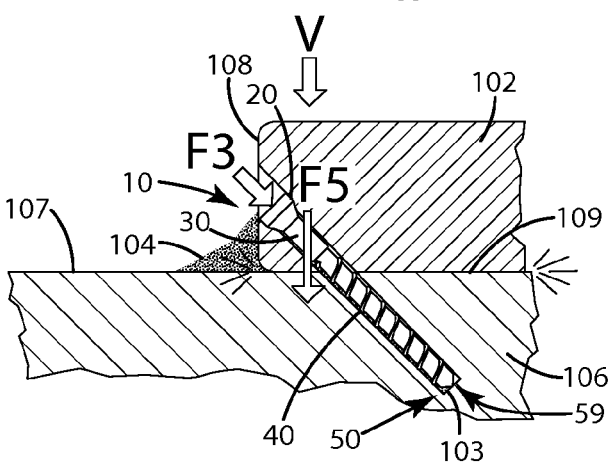
FIG. 10 is a fourth side view of the fastener as it is fully advanced into the first and second work pieces.

FIGS. 7-10 illustrate an example of a screw 10 of the current embodiment being installed in a first work piece 102 and a second work piece 102 to join those work pieces. Generally, the screw 10 joins the first work piece 102, which can, for example, be a board, to a second work piece 106, which can be a subfloor, joist or some other support structure. Also illustrated is the material 104 previously augered out from the hole 103 which the screw self-bored for itself. As shown in FIG. 10, the screw 10 can be advanced into the board 102 a desired distance so that the head is not too conspicuous when viewed from above. The screw 10 can be screwed into the side surface of the board at an angle β which optionally can be about 15° to about 65°; further optionally about 45° or any other desired angle. If desired, the screw can be advanced at a non-orthogonal angle to the surface of the board, or optionally an angle other than 90° relative to the surface of the board. Again, although shown connecting a board to an underlying joist, the screw 10 described herein can be used in any application where it is desirable to use a screw with a feature that pre-bores a screw hole with the screw itself. For example, it can be used to join corners of boards, used in cabinetry or as trim, particularly where the wood or other materials require a pilot hole to be pre-bored before installation of a screw to prevent splitting, or simply to facilitate advancement of the screw into the work piece.

Figure 7:
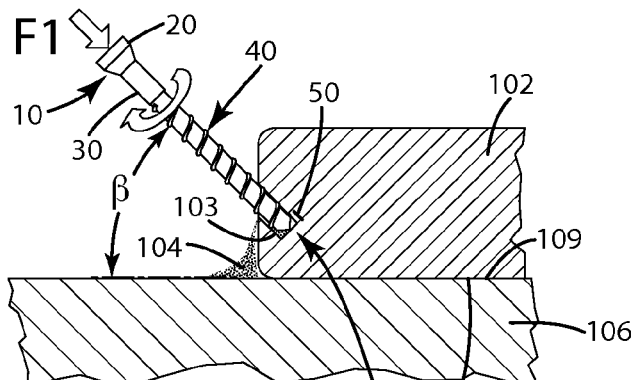
FIG. 7 is a first side view of the fastener being initially installed in a first work piece.

Further referring to FIGS. 7-10, a method of installing a current embodiment of the screw will now be described in more detail. As illustrated, the screw 10 includes a shaft 30, threads 40, a screw end 50 and the chisel brake point 59. The screw 10 can be advanced through a first work piece 102 and into a second work piece 106. As shown in FIG. 7, the first work piece 102 is engaged by the chisel brake point 59 and rotated in the direction of the arrow with a tool (not shown) joined with the screw head. A force F1 can be applied by a user to initiate the screw in boring into the side of the work piece 102 at some preselected angle β, which can be established by a user via an installation tool as described below or some other type of guide or tool. The screw 10 can be advanced into the work piece 102, and in so doing, the chisel brake point 59 can begin to scrape away material 104 from the hole 103 that the point creates in the work piece 102. The force F1, which is transferred to the screw 10 to bore the screw into the work piece 102, can be between about 1 and about 35 pounds, or more or less depending on the application, the type of wood or composite, and the type of installation tool.

Referring further to FIG. 7, the screw is advanced or fed at least partially into the work piece 102. During this advancement, the chisel brake point 59 bores away material 104 to create the hole 103 into which the screw 10 advances or feeds. The chisel brake point 59, retards the feed or advancement of the screw into the work piece 102, and generally provides a braking force to prevent the screw from being rapidly advanced into the work piece 102. In turn, this can impair and/or prevent damage to the material surrounding the screw 10, and can specifically prevent and/or impair splitting of materials, for example, wood in the area in which the screw is advanced. As a more specific example, the braking force can impair rapid advancement of the screw into the work piece 102, which advancement would otherwise typically be generated by the threads 40 engaging the work piece and thrusting it into the work piece, to prevent a lower corner of the work piece 102 from splitting off the remainder of the work piece. As shown in FIG. 8, the screw 10 can continue to be rotated, and fed into the work piece 102, with material 104 continuing to be augured by the threads 40 out from the hole bored by the chisel brake point 59.

As the screw 10 advances into the work piece 102, the chisel brake point 59 can act as a brake to retard or reduce the feed rate of the screw 10 into the work piece 102 for a preselected distance 77. This preselected distance can be anywhere from ⅛, ¼, ½, ¾, 1, 1¼, 1½, 1¾, 2, 2½, or more, or less, inches. As shown, the preselected distance 77 is about ½ to ¾ of an inch. Optionally, this distance can correspond to the distance between one surface 108 of the work piece 102 and a second surface 109 of the work piece 102, so that the feed rate of the screw generally is slowed through a portion or all of the first work piece, which may be more prone to splitting or damage.

Further, as shown in FIGS. 7 and 8, as the screw 10 advances, and the chisel brake point 59 acts to retard advancement of the screw into the work piece, the threads 40 also can engage the material of the work piece surrounding the bore 103 bored by the chisel brake point 59. During such engagement, the threads 40 can rotate or move relative to the sides of the bore 103 without substantially advancing the screw into the work piece upon such engagement, or generally without the threads thrusting the screw into the work piece at the theoretical feed rate for which the threads are designed. Optionally, this can contrast operation of conventional screws, where the engagement of the threads of those screws with the material surrounding the screw would typically lead to those threads thrusting the screw into the work piece at the theoretical rate of feed for which the threads were designed.

As the screw is advanced the preselected distance 77, shown in FIG. 8, the force F2 applied can be equal to or greater than the initial force F1 applied to initiate advancement of the screw. Further, the screw can rotate about the axis anywhere from optionally about 10 to about 100 rotations; further optionally about 15 to about 70 rotations; even further optionally about 20 to about 50 rotations, yet further optionally at least about 25 rotations, as it is advanced into the work piece 102, until the head of the screw engages the work piece. This can contrast a conventional sharp pointed screw, which typically might only be rotated about five to twelve times, depending on the number and characteristics of threads on the conventional sharp pointed screw. This also can contrast the design of the threads of the screw 10. For example, the threads may be designed to advance the fastener into the work piece so the head engages the work piece optionally within about 10 to about 20 rotations, further optionally in less than about 15 rotations of the fastener about the axis. The additional rotations of the embodiments to advance the fastener to a desired depth herein, for example, where the head engages the work pieces, can be attributed to the braking action or force generated by the chisel brake point 59 at the end of the screw, which slows or impairs advancement of the screw into the material of the first work piece 102.

When the screw has been advanced into the work piece 102 the preselected distance 77, a number of the threads 40 sufficiently engage the hole 103 which was pre-bored by the chisel brake point 59, and the material surrounding the hole of the work piece 102. Further rotation of the screw 10 in the direction of the arrow causes the threads to overcome the braking force created by the chisel brake point 59. Optionally, this overcoming of the braking force can occur when the preselected distance generally corresponds to the dimension of the work piece in the area where the screw 10 penetrates or is otherwise bored through the work piece 102. The engagement of the threads 40 with the hole 103 and subsequent overcoming of at least a portion of the braking force generated by the chisel brake point can increase the rate of advancement of the screw through the work piece 102, as well as the rate of advancement of the screw into and through a portion of the second work piece 106. Accordingly, the braking force and subsequent retarding forces and action of the chisel brake point 59 is overcome a desired amount so that the threads 40 advance the screw through the first work piece and into the second work piece at an increased rate of feed.

Optionally, the screw then can begin to advance into the second work piece 106. The rate of advancement or feed, when with the threads overcome at least a portion of the braking force, can result in the screw 10 being advanced or fed about 1, 2, 5, 7, 10, 12, 15, 20, 25, 30, 35, 40 and/or 50 (or any range between or above any of the aforementioned values) times faster than when the braking force of the chisel brake point was retarding advancement of the screw. With the threads 40 sufficiently engaging and advancing the screw into the work pieces, the force F3 in FIG. 9, and F4 in FIG. 10, applied to the screw can be less than the forces F1 and F2 applied before with the braking force of the chisel brake point 59 was overcome by the forward thrust caused by the threads 40.

As shown in FIG. 9, the screw 10 can be advanced into the first work piece 102 and further into the second work piece 106. During this advancement, the chisel brake point 59 can provide a braking force, but most, if not all, of it is overcome by the feeding force generated by the threads 40 engaging the material surrounding the hole 103. The chisel brake point 59 also can pre-bore a hole 103 in the second work piece 106. Material 104 also can be augured out from the respective hole created by the screw in the second work piece 109. Where the installation tools described herein are used to install the screw, that material can be ejected from a material ejection port as described below.

With reference to FIG. 10, the screw 10 can continue to advance until the screw head 20 is sufficiently indented in or buried in the side surface 108 of the work piece 102. In some cases, the head of the screw is completely positioned in the hole 103, so that no portion of the head extends beyond the first surface 108 of the work piece 102. Optionally, the screw 10 can be advanced sufficiently so that it is at least partially hidden from a viewer "V" viewing the work piece generally from above. With the screw 10 installed as shown, optionally about 20% to 100%, further optionally about 50% to 90% of the holding force F5 of the screw 10 is provided via the screw shaft 30 and/or threads 40, rather than via the head 20 of the screw 10. Further, where screws 10 are similarly installed on opposite side surfaces of the work piece 102, with the screws generally pointing toward one another and embedded in the underlying work piece 106, those opposing screws can cooperatively provide sufficient force to hold down the work piece 102, with a substantial portion of the holding force being supplied via the shaft of the screws, rather than the heads of the screws.

Another feature of the screw of the embodiment herein concerns the chisel brake point 59 and its effect on feed of the screw. Optionally, the point 59 can include inclined surfaces that are at an angle relative to one another so that they provide a sufficient braking force such that the screw does not feed or advance into the first work piece 102 at a rate corresponding to the pitch of the threads 40 until after the chisel brake point at least partially penetrates through the work piece 102, for example, a preselected distance 77, or through the second surface 109 of the work piece. In such a manner, the screw can prevent or impair excessive wedging of the threads 40 and/or shaft 30 through the material of the work piece 102 surrounding the screw 10, thereby preventing or impairing damage such as splitting to that material and the corresponding corner edge of the work piece 102. With the screw substantially or fully penetrated through the first work piece 102, its rate of advancement can change, and generally increase, so that it advances at a faster rate into the second work piece 106. Of course, in so doing, the remaining portion of the screw in the first work piece 102, including the shaft 40 and head 20, can be advanced in and/or through the first work 102 piece at a greater rate than the rate before the screw penetrated the second surface 109 of the work piece 102.

In the above described mode of operation, the feed rate of the screw 10 into and/or through the work pieces also can change as the screw is advanced or fed into the first and/or second work pieces 102, 106. For example, as the screw 10 is turned in the direction of the arrow in FIG. 7, the feed rate of the screw 10 into the work piece 102 can be a percentage slower or less than the theoretical feed rate provided by the pitch and configuration of the threads 40. As a more specific example, the threads 40 can be configured to provide a theoretical feed rate of one millimeter per one revolution of the screw 10. Due to the braking forces provided by the chisel brake point 59, however, the actual feed rate of the screw 10 can be only 0.25 millimeters per one revolution of the screw 10. This braking force or action can retard advancement of the screw, or otherwise reduce the feed rate of the screw for the preselected distance 77 (FIG. 8). As more threads 40 of the screw engage the material surrounding the hole 103 bored by the chisel brake point 59, the braking force provided by the chisel brake point 59 can be overcome by the threads 40. The feed rate of the screw 10 can increase dynamically as more threads engage the material of the work piece 102, overcoming the braking force.

Thus, by example only, the feed rate of the screw into the work piece 102, after the chisel brake point 59 has advanced a preselected distance 77 into the work piece 102, can increase from 0.25 millimeters per one revolution (which is caused by the braking force of the chisel brake point) up to 1.0 millimeter per one revolution, which again can be the theoretical feed rate of the screw based on the pitch of the threads 40. When the screw 10 penetrates through the other surface 109 of the work piece 102, it can be advanced at a feed rate of about one millimeter per revolution. Accordingly, when it enters the second work piece 106 it can be advanced at the full theoretical feed rate, or at some percentage, for example, about 70%, 80% or 90%, of the full feed rate.

In general, the feed rate of the screw 10 into the work piece 102 can dynamically change from a first feed rate to a greater, second feed rate as the screw enters the work piece, nearing the preselected distance 77. This can occur because additional threads 40 of the screw 10 begin to engage the material around the hole pre-bored by the chisel brake point 59. As more threads engage the work piece 102, the forward force/thrust provided by those threads begins to overcome the braking force provided by the chisel brake point 59.

The aforementioned mode of operating the fastener 10 of the current embodiment and screw features also yields a suitable method for installing a fastener to join a first work piece with a second work piece. In this method, a fastener 10 is provided. The fastener can be the screw of any of the embodiments herein, having a chiseled brake point 59 and threads 40, where the threads are configured to advance the fastener 10 at a first feed rate, which for the sake of this example, can be a theoretical feed rate. The fastener 10, and in particular, the chiseled brake point 59 can be rotated and brought into engagement with the first work piece 102 as it is rotated. Initially, the chiseled break point can penetrate the side surface of the work piece, as generally shown in FIG. 7.

Optionally, the screw 10 can be held with an installation tool at a preselected angle, and generally aimed at the angle β at the side surface 108 of the work piece 102. The installation tool can also engage the head or other portions of the screw to rotationally restrain the fastener as it is advanced, and generally to prevent or impair excessive wobble of the screw in so doing. In general, the installation tool or some other driver, such as a drill, can rotate the fastener.

The fastener 10 can be advanced into the first work piece 102 at a second feed rate, less than the first feed rate, due to the chisel brake point 59 retarding advancement of the fastener 10 into the work piece 102 and providing a braking force that reduces the first feed rate of the fastener into the work piece to the second feed rate, or more generally impairing the fastener from increasing its feed rate to the theoretical feed rate of the screw 10.

Returning to the method, the chisel break point 59 can pre-bore a hole in the first work piece 102 and the second work piece 106. When the fastener is advanced so that it extends through the first work piece and engages the second work piece, the hole 103 generally is completely bored through the first work piece. The diameter of that hole 103 can be about the size of the widest diameter of dimension of the chisel brake point 59, but smaller than the outer diameter of the threads 40 of the fastener so that those threads can still bite into the material surrounding the hole and alter the feed rate of the fastener as described herein.

When the fastener 10 begins to advance and continues to advance into the second work piece as shown in FIG. 9, the threads 40 of the fastener generally pull the remaining shaft 30 (if any) above the threads, and the head 20 of the fastener into and/or through the pre-bored hole until rotation ends and the fastener achieves a desired depth of installation in the work pieces. As shown in FIG. 10, the fastener can be advanced so that the threads 40 are substantially located in the second work piece 106, but not the first work piece 102. The shaft 30 and head 20 of the fastener 10, however, can remain in the first work piece as the fastener 10 also continues to advance into the second work piece 106. As a result, the head 20 and optionally the shaft 30 can pull down the first work piece 102 into further securing engagement with the second work piece, and can further pull the second work surface 109 toward and into engagement with the first work surface 107.

Generally, the aforementioned depth of installation corresponds to the fastener head 20 being at least partially located, if not fully located within the pre-bored hole 103. The head 20 also can be generally concealed from view for a viewer V from above. For example, the head can be sufficiently buried in or located within the interior of the pre-bored holed in the first work piece so that it is not readily visible to a viewer V from above without close inspection. Sometimes, where the work piece is constructed from wood or composites, the material around the pre-bored hole may swell or at least partially fill the pre-bored hole above the head back in to even further conceal the head of the fastener 10.

The depth of the fastener 10 in the work pieces after installation also can correspond to a sufficient portion of the threads 40, and shaft 30 if desired, being located within the second work piece, and a sufficient portion of the shaft, as well as the head 20, being located in the first work piece, where the fastener joins the first and second work pieces to one another.

Figure 11:
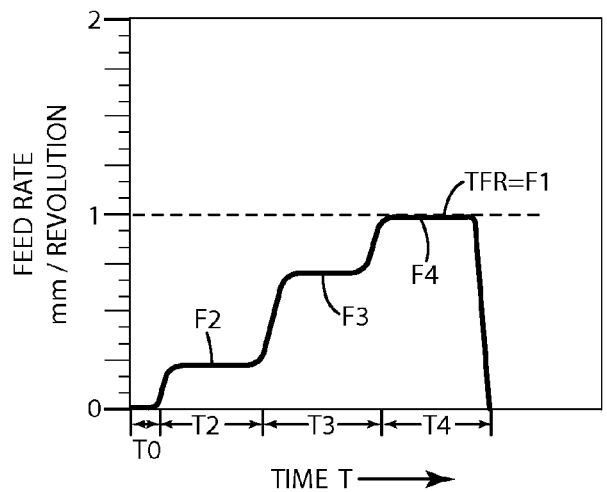
FIG. 11 is a chart illustrating the feed rate of the fastener into work pieces over time.

A chart illustrating the feed rates as the screw 10 is advanced is presented in FIG. 11. There, the y-axis represents the feed rate in millimeters of advancement into the work piece per revolution. The x-axis represents the passage of time as the fastener is installed, starting from when the fastener first engages the first work piece at T0, where time is equal to zero, to when the fastener is fully installed at TE. The theoretical feed rate TFR, also referred to as a first feed rate herein, is a function of the geometry of the thread, and more particularly, the pitch and/or angle of the threads as explained above. As shown in FIG. 11, during time T0, as the fastener is initially rotated, it begins to engage the work piece, so it does not feed into the work piece.

As the fastener 10 continues to rotate and penetrate into the work piece, the threads 40 engage the work piece. Generally, however, the threads during time T2 do not substantially advance the fastener 10 into the work piece. Much of the advancement, or the feed rate F2 in general, is due to the force being applied to the fastener through the head. Some or a small part of the advancement can be provided by the threads during T2. During T2, the chisel brake point 59 can pre-bore the hole for the remainder of the fastener.

The fastener 10 can continue to be rotated and advanced at feed rate F2 a preselected distance 77 (FIG. 8) into the work piece 102, with progressively more of the threads 40 of the fastener 10 engaging the work piece until that engagement of the threads with the work piece at least partially, if not substantially, overcomes the braking force. At about that point, the advancement of the fastener 10 can generally increase from the second feed rate F2 to a greater third feed rate F3, that is optionally between the second feed rate F2 and the first feed rate TFR. This increase in the feed rate is generally represented in FIG. 11 between the transition between F2 and F3. While the transition between the feed rates is shown as abrupt, it can occur gradually if desired.

The fastener 10 can continue to advance until it extends through the first work piece and engages the second work piece. Shortly after it engages the second work piece, the rate of advancement of the fastener can further increase, transitioning from the third feed rate F3 to the fourth feed rate F4. This increase can be due to many, if not all of the threads 40 engaging the work piece(s) to advance the fastener into the work piece(s). The fastener 10 can continue to be advanced at the fourth feed rate F4 that is optionally between the third feed rate and the first feed rate TFR, and optionally at or near the first feed rate or TFR.

In operating at the fourth feed rate F4, the fastener 10 can be advanced into the first surface 107 of the second work piece 106 as shown in FIG. 8. Generally, the fastener can be advanced into the second work piece, which can be an underlying work piece, such as a floor joist at a faster feed rate, such as the TFR because there is not much concern of splitting or damaging that structure as a result of the screw shaft being wedged or quickly advanced into the material of that work piece. Optionally, the fastener 10 can be advanced into the second work piece parallel to the longitudinal length of the second work piece. When the fastener is fully installed in the work pieces, the advancement stops, which is represented at TE in FIG. 11.

Generally, the changes from one feed rate to another as mentioned above can occur due to the geometry and interaction of the chisel brake point, threads and head of the fastener with one another and/or the work piece(s), rather than due to changes in the external forces F1, F2, F3, F4 or other forces applied to the fastener as it is advanced. Indeed, the forces F1, F2, F3 and F4 can be substantially the same throughout the advancement of the fastener into the work pieces. Likewise, the rate of revolutions per minute (RPMs) of the fastener can remain generally the same throughout the advancement of the fastener in to the work pieces. What can change however, is how fast the fastener advances under those RPMs, again, due to the geometry of the fastener and the interaction of its components.

Although the different feed rates F2, F3 and F4 are shown as transitioning from one to the other rather abruptly, those feed rates can transition from one to the other gradually, so that the transitions are less stepped. This can be achieved by varying the geometry of the threads, the chisel brake point, and or other features as desired.

I. First Alternative Fastener Embodiment

A first alternative embodiment of the fastener is illustrated in FIGS. 12-17 and generally designated 110. This embodiment is similar to the above embodiment above in construction and operation with a few exceptions.

Figure 15:
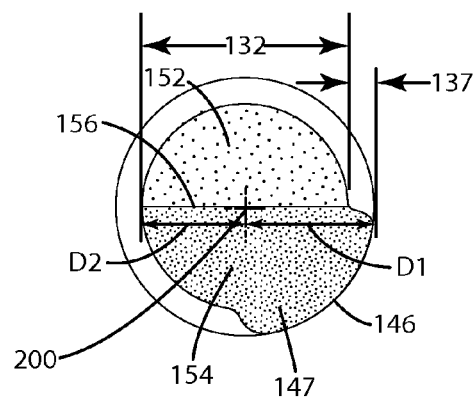
FIG. 15 is an end view of the first alternative embodiment of the fastener.
Figure 16:
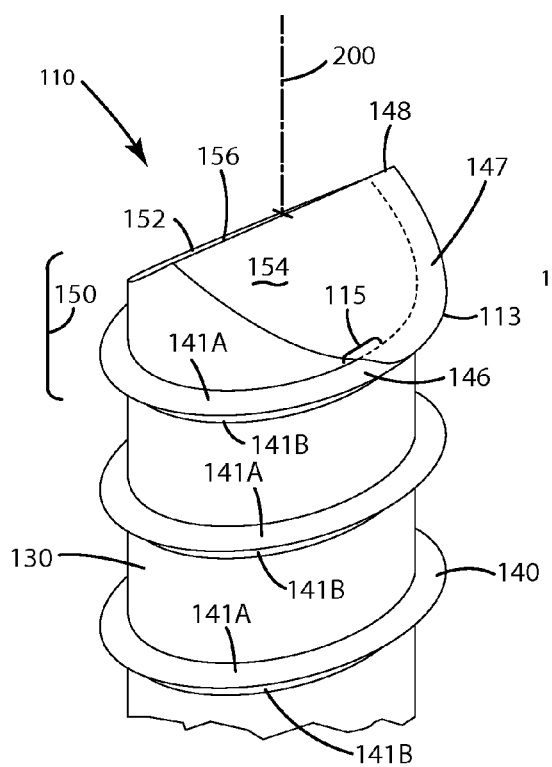
FIG. 16 is an enlarged perspective view of the first alternative embodiment of the fastener.

To begin, the end 150 of the fastener can include a different thread geometry and inclined surface configuration. For example, the end 150 can include a chisel edge 156 that extends across the diameter 132 (or some other chord or dimension) of the shaft 130. The chisel edge 156 can be in the form of and function like the chisel brake point explained above if desired. However, the chisel edge 156 also can extend slightly beyond the outer diameter 132 of the shaft 130 as shown in FIGS. 15 and 16 by a distance 137. In so doing, at least a portion of the last thread 146, for example, the leading portion 148, can form part of the chisel edge 156, or more generally the chisel brake point. With the last thread 146 forming this extension, the chisel edge 156 can be configured asymmetrically about the longitudinal axis 200. For example, a first portion of the chisel edge 156 can extend a first distance D1 from the longitudinal axis on one side of the axis, and a second portion located on the opposite side of the longitudinal axis can extend a second distance D2 on the other side of the longitudinal axis 200. The distance D1 generally can be greater than distance D2. This difference in the distances can be equal to the depth of the last thread, or some other dimension as desired.

The chisel edge 156 extends rearward from the very end of the fastener 150 generally in a V-shape with the inclined surfaces 152 and 154 inclined relative to one another at an angle: which can be in the range of about 90° to about 105°, or optionally about 90° to about 135°, or further optionally about 90° to about 150°, or even further optionally 90°±10°. It has been discovered that with these ranges of angles incorporated into the chisel edge, the fastener 110 can pre-bore holes well into composite work pieces, as well as fiber or natural wood work pieces. For example, this range of angles is blunt enough so that it can slow or retard advancement of the screw into a wood board, and allow a hole to be pre-bored therein. Substantially more acute angles, where: is less than 45°, on the other hand, can be too pointed, and can cause the fastener to rapidly drill into the wood board, almost at, if not at, the theoretical feed rate of the fastener and related threads. In turn, this rapid advancement of the fastener can split or damage the work piece.

The above range of angles is also sharp enough so that the end of the fastener can pre-bore a hole, rather than melt a hole in a work piece, such as a board, that is constructed from composites, such as a polymer or plastic or wood/plastic hybrid. Substantially more obtuse angles, where: is greater than 170°, on the other hand, can be too blunt, and can cause the fastener end to simply melt a hole into the wood work piece, at a feed rate that is unsatisfactory for practical use. In addition, the melting of the work piece material can rapidly gum up the threads of the fastener, and prevent the melted material from ever making it to the surface of the work piece. In turn, this can cause the surrounding material to bulge and present aesthetic issues.

Returning to FIGS. 15-17, the inclined surfaces 152 and 154 can intersect at the chisel edge 156 and form at least portion of it. One or more of the inclined surfaces can transition to or merge with the last thread 146. More particularly, the last thread 146 can form at least a part of, and lie in the same plane or curvilinear surface as, one or more of the inclined surfaces 154. Depending on the angle of the inclined surface 154 relative to the longitudinal axis 200 or the other surface, more or less of the last thread 146 can form a part of that surface.

Figure 12:
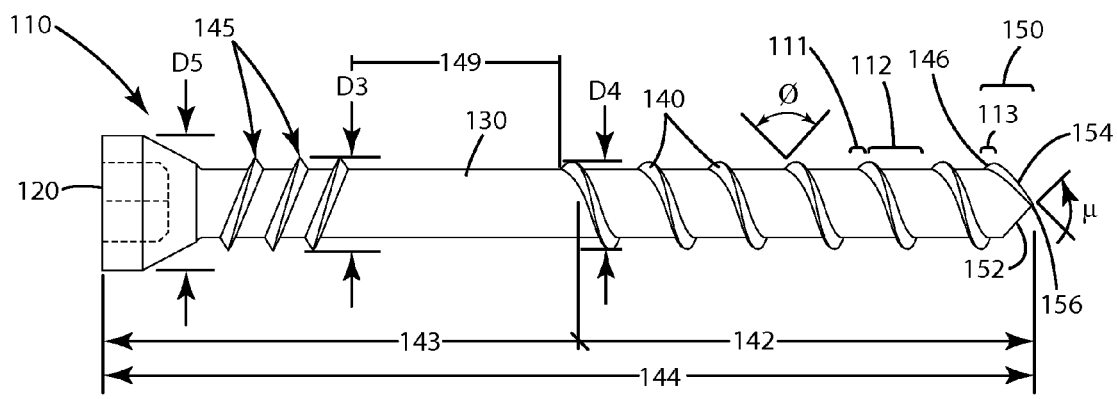
FIG. 12 is a side view of a first alternative embodiment of the fastener.
Figure 13:
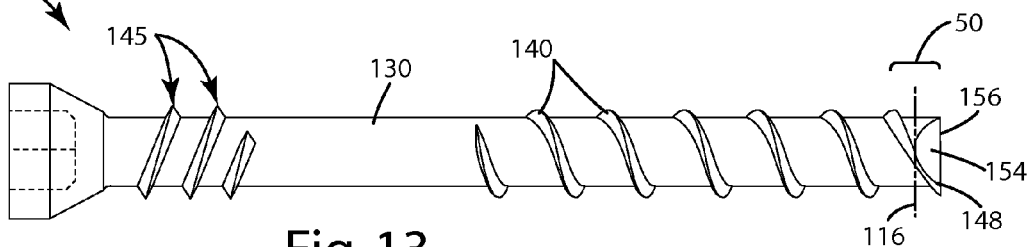
FIG. 13 is a second side view of the first alternative embodiment of the fastener.
Figure 14:
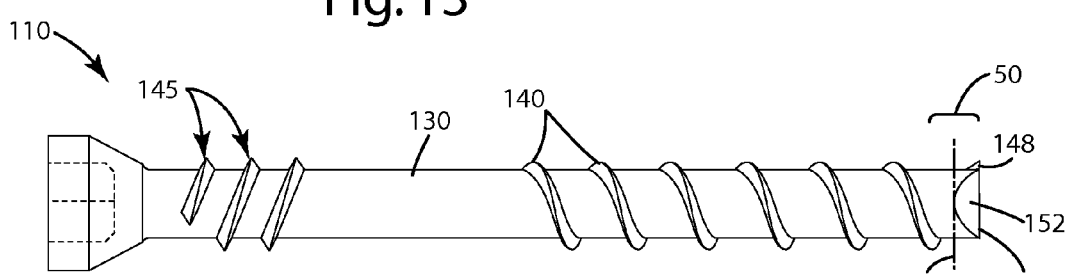
FIG. 14 is a third side view of the first alternative embodiment of the fastener.

Optionally, the inclined surfaces 152 and 154 can be located between a boundary 116 on the shaft 130 and the chisel edge 156 as illustrated in FIGS. 12-14. The boundary 116 can mark the location at which one or both of the inclined surfaces begin on the shaft 130 or within the end 150 of the fastener 110. Where included, the thread 140 and/or last thread 146 also can be formed beyond the boundary 116, in the end, between the boundary and the chisel edge or chisel brake point. Optionally, these threads can also extend rearward from that location toward the head in a continuous, generally uninterrupted manner as well.

As shown in FIGS. 15 and 16, the last thread 146 merges or transitions into the inclined surface 154 at the intersecting portion 147 of these elements. This intersecting portion 147 can lie within the same plane or curvilinear surface as the inclined surface 154, and can form a continuous surface with the inclined surface 154 as illustrated. The intersecting portion 147 can extend the inclined surface 154 beyond the shaft 130 a distance equal to the depth of the last thread 146, the leading portion 148, or some other distance. Thus, with this intersecting portion acting as extension of the inclined surface, the inclined surface 154 can have a greater surface area than the opposing inclined surface 152. Optionally, although not shown, a part of the last thread can extend beyond the chisel edge 156, in which case, that part can form a portion, and optionally another surface extension of the other inclined surface 152 as well.

Returning to FIGS. 15-17, the last thread 146 can include a leading portion 148 at which the last thread terminates. The leading portion 148 can be the part of the last thread that actually merges or transitions directly into the inclined surface(s), and can include at least a portion of or overlap the intersecting portion 147. The leading portion 148 can extend all the way to the chisel edge 156, or it can extend somewhat beyond the chisel edge and form part of the other inclined surface 152, or it can terminate somewhere adjacent the inclined surface 154, and/or the inclined surface 52.

The leading portion 148 can extend outward from the shaft 130 the full depth of the other threads 140, or some other preselected greater or lesser depth. The leading portion can transition rearward from the chisel edge 156 to the remainder of the last thread 146, which in turn furls or coils around the shaft 130 at or near the end 150, depending on the thread configuration, and transitions to the other threads 140 extending outward from the shaft. The leading portion 148, the last thread 146 and the other threads 140 can form a unitary thread that extends from the chisel edge 156 continuously up the shaft 130 optionally without any interruptions or voids in the thread, until it terminates somewhere in a middle region of the shaft 130.

Optionally, the threads 140, 146 and fastener 110 in general can be void of any self-tapping grooves or discontinuities that assist the fastener initially penetrating a very dense material, such as a metal. The upper and lower thread surfaces 141A and 141B of the last thread 146 and the remaining threads 140 likewise can be continuous from the chisel point to the end of the threads 140 in the middle region of the fastener 110. Of course, if voids or interruptions are desired in the threads for certain applications, they can be included.

Further optionally, the last thread 146 can merge with the inclined surface at the leading portion 148, with the last thread and all threads terminating at that location. As an example, there may be no additional thread or threads or portions of threads located between the chisel edge and the leading portion.

Figure 17:
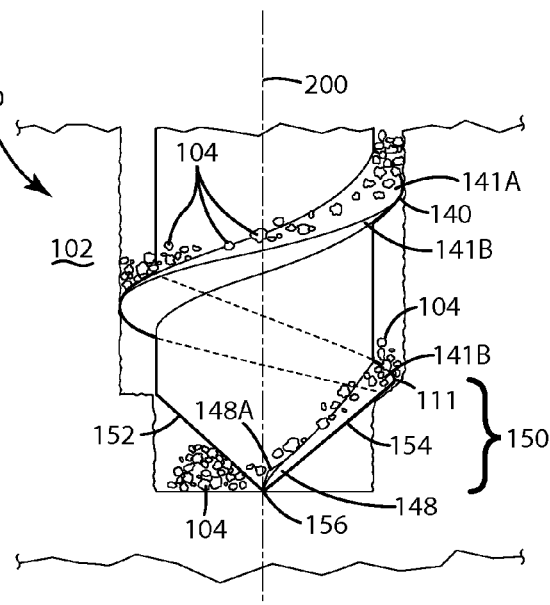
FIG. 17 is an enlarged side view of the end of the first alternative embodiment of the fastener engaging a work piece.

As shown in FIG. 17, the leading portion 148 optionally also can include a forward surface 148A which generally is located adjacent and forms a part of the lower thread surface 141B. The forward surface 148A can generally be inclined or effect relative to the axis optionally by about 0° to about 45°, further optionally about 2° to 10°. The forward surface 148A optionally can extend all the way to and generally intersect the chisel edge 156. Opposite the inclined surface 154, in some applications, the forward surface 148A can also form a partial extension of the chisel edge 156. If desired, the forward surface 148A can form a ramp from a location at or adjacent the chisel edge 156. This ramp can operate to scrape material from the bottom of the hole 103. This ramp also can operate to scoop or route material 104 adjacent the shaft 130, can be onto the lower thread surface 141B. As the fastener turns, the scooped material augered farther up the lower thread surface 141B.

The fastener of this first alternative embodiment as shown in FIG. 12 can be of a length 144, and generally divided into a first portion 142 and second portion 143. Optionally, the length 144 can be about 1.5 to about 2.0 inches, optionally about 1.8 inches, with the first portion 142 being about half the length 144 and the second portion 143 being about half the length as well. Of course, the screw may be of various other lengths, or example, it can be 2 inches, 3 inches, 4 inches or other increments therebetween depending on the application. Further, the first and second portions 142 and 143 can be subdivided in different ratios depending on the application.

The first portion 142 can include primary threads 140 and the chisel edge 156 described above. The first portion 142 can be about half the length 144 of the fastener, or about a or ¼ the length of the screw, or other portions as desired. The second portion 143 can be threadless and can include an optional head 120 of the fastener 110. The outside primary threads near the end 150 can be less sharp than the threads closer to the head 120 of the screw if desired to prevent the or impair those threads from biting into and advancing the fastener into the work piece at an undesired rate. Of course, the threads can be uniformly sharp from end to end. The pitch of the threads 140 optionally can be about 2 mm to about 4 mm, and further optionally about 3 mm. Generally, as used herein, the pitch refers to distance from one point on the thread to the corresponding point on an adjacent thread measured parallel to the axis 200.

The threads 140 and the last thread 146 can be of a thread design having a "V" profile or a buttress profile depending on the application. Further, as shown in FIG. 12, the threads and last thread can each include a thread angle Ø, which is generally the included angle formed between the upper and lower thread surfaces 141A and 141B. This angle can be optionally between 10° and 90°, further optionally between 30° and 70°, and still further optionally between 55° and 60°, and even further optionally about 60°.

The threads 40 each can also include crests 111 and roots 112 between each crest of the threads. As shown in FIGS. 12 and 16, the last thread can include a crest 113. This crest 113 can continue to the leading portion 148, or can terminate short of it as desired. The crest 113, and more generally the last thread 146 also can thin substantially in the intersecting portion 147 where the last thread 146 merges or transitions into the inclined plane 156. Indeed, the inclined surface 154 and intersecting portion 147 can extend outward to the crest 113, such that the planar, curved or other surface of the inclined surface and/or intersecting portion terminates at the crest 113 for at least a portion, if not all of the last thread 146 and/or the leading portion 148.

As illustrated in FIG. 16, the inclined surface 154, and more particularly the intersecting portion 147, can form a part of the last thread where the last thread merges into these elements. For example, the last thread in this region can generally include the lower thread surface 141B on one side of the crest 113 of the last thread, and can include the intersecting portion 147 that merges with the inclined surface 154 on the opposite side of the crest 113 of the last thread 146. As the last thread 146 furls or coils away from the leading portion 148 or the chisel edge 156, the inclined surface 154 and/or intersecting portion 147 themselves can merge or transition to the upper thread surface 141A in the transition region 115. This transition can be abrupt, with a perceivable drop off from the inclined surface 154 and/or intersecting portion 147 to the upper thread surface 141A, or it can be gradual, with inclined surface 154 and/or intersecting portion 147 angling or curving away from the upper thread surface 141A at a small angle or curvature.

While the second portion 143 can be unthreaded, it optionally can include secondary threads 145 as shown. These secondary threads 145 can be included on the shaft 130 at or near the head and can extend a predetermined distance within the second portion 143 of the length of the screw 110. The primary threads 140 and secondary threads 145 can be separated by a void located along the shaft 130. the void can be of a preselected length 149.

The secondary threads 145 can be of the same threading as the primary threads 140, or alternatively can include a reverse thread, generally running in the opposite direction of the threads 140 in the first portion 142. The pitch on the secondary threads 145 optionally can be about 2 mm to about 4 mm, and further optionally about 3 mm. The pitch on the secondary threads 145 can be about 1.5 to 2 times greater than the pitch on the primary threads 340, in addition to being reverse threaded along the shaft 130. Further, the outer diameter D3 of the reverse threads 145 can include an outer diameter that is smaller than the outer diameter D4 of the primary threads 140. As an example, the outer diameter of the reverse threads can be about 1.4 inches, and the outer diameter of the primary threads can be about 1.6 inches. Optionally, the outer diameter of reverse threads 145 can be about 0.1 to about 0.4 inches less than the outer diameter of the primary threads 140.

The head 120 of the fastener shown in FIG. 12 optionally can be of a diameter D5 that is greater than the other diameters D3 and D4. This larger size of the head can enable a drive tool to be attached to the head and driven. The larger size of the head can also enable the head to engage the material surrounding the pre-bored hole 103 and provide some holding force, in addition to the shaft, to hold the work pieces in a desired orientation.

In operation, the screw 110 can function and can be installed in a manner similar to the embodiments described above. Where the leading portion 148 and last thread 146 terminate adjacent or near one or more of the inclined surfaces, however, these features can provide enhanced augering. For example, as shown in FIG. 17, as the material 104 is scraped from the work piece within the pre-bored hole 103, the small pieces of material, which can be in the form of chips, fragments, fibers, or parts of the work piece are scraped from the bottom of the hole by the leading portion 148. In effect, these parts can be scooped or picked up by the leading portion 148 and the last thread 146, and where included, the forward surface 148A, and augered up the last thread to the other threads 140. The material 104 can travel on the lower thread surface 141B as illustrated, generally continuously up the threads until it is ejected out from the hole to the environment or into a tool as described below.

In applications where the work piece into which the fastener 110 is advanced is a composite board, the scooping and scraping action of the leading portion and end 150 can almost immediately auger out the material 104 from the pre-bored hole. This can prevent melting of that composite material due to excessive churning in the bottom of the hole, which in turn can prevent the screw from becoming gummed up with the melted material as it is augered up the threads, thereby impairing advancement of the screw into the composite.

Figure 18:
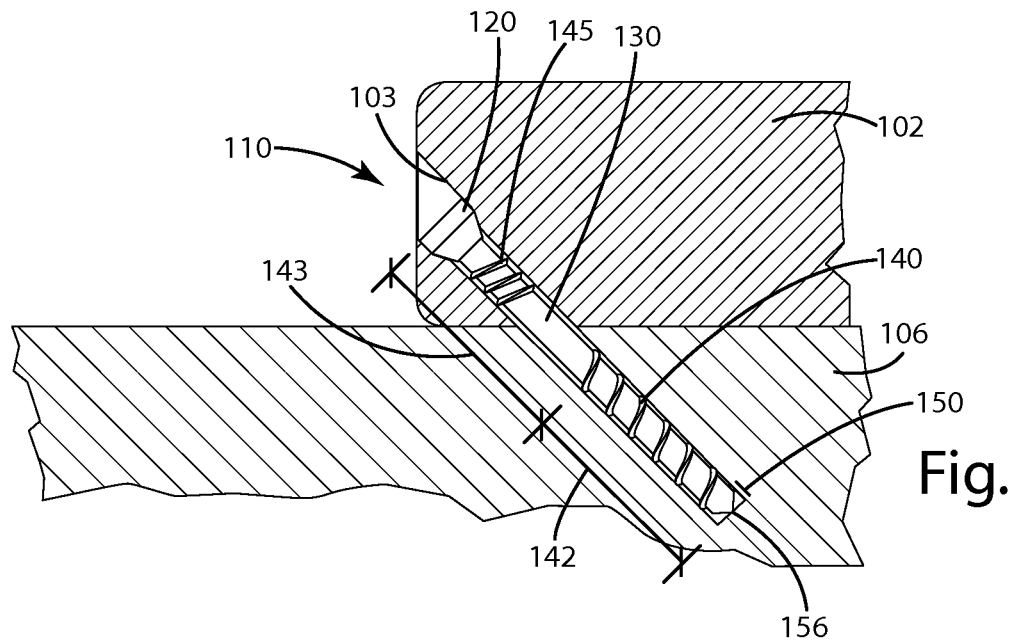
FIG. 18 is a side sectional view of the first alternative embodiment of the fastener installed in first and second work pieces.

FIG. 18 illustrates the fastener 110 installed in work pieces 102 and 106 at a predetermined angle, much like the embodiment described above. Leading up to that installation, the fastener 110 can undergo the operations, can be installed at the angles, and can feed at the feed rates as described in any of the embodiments above to connect the work pieces 102 and 106.

As shown in FIG. 18, however, the optional additional secondary threads 145 can provide a slightly different holding effect than that of the embodiments described above. For example, where the secondary threads 145, which again may be reverse threads, are included, those reverse threads can assist in drawing the work piece 102 more toward the second work piece 106. Further because there is a void between the primary threads and the secondary threads, that void can allow the first work piece 102 to draw down against the second work piece 106. The optional reverse threads also can rotate within the pre-bored hole 103, thereby scraping the loose ends of material from that hole, which can provide a clean finished hole above the location where the head 120 comes to rest after being fully installed.

After the fastener 110 is fully installed, the optional reverse threads can provide additional holding power to prevent the work piece 102 from being removed from the second work piece 106 under force. For example, the added contact between the reverse threads and the material surrounding the pre-bored hole 103 can provide more friction between the fastener and the hole, which in turn can make much more force required to pull the work piece 102 away from work piece 106.

Optionally, a first fastener 110 is installed on one side of a work piece 102, such as a board, and a second fastener is installed directly across from the first fastener on an opposite side of the board, and in some cases in the same plane as the first fastener. Where these opposing fasteners optionally include the secondary threads, these threads can provide even more holding force to keep the work pieces fastened together.

II. Second Alternative Fastener Embodiment

Figure 19:
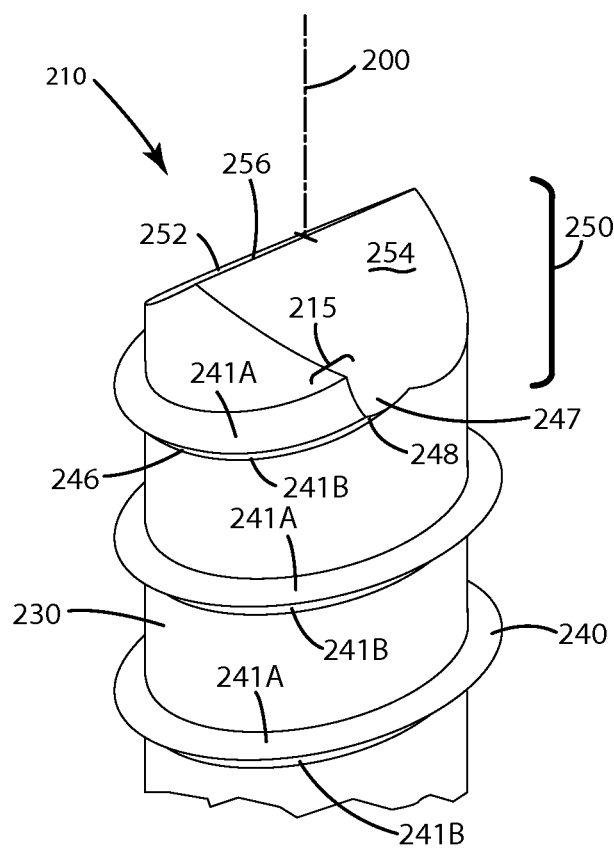
FIG. 19 is an enlarged perspective view of a second alternative embodiment of the fastener.

A second alternative embodiment of the fastener is illustrated in FIG. 19 and generally designated 210. This embodiment is similar to the above embodiments in construction and operation with a few exceptions. For example, the end 250 of the screw 210 can generally include a last thread 246 that is included within the primary threads 240. This last thread 246 can also include upper 241A and lower 241B thread surfaces, as can the remainder of the primary thread 240 as illustrated in FIG. 19. The last thread 246 can end at a leading portion 248. This leading portion 248, and more generally the last thread 246, can transition or merge with the inclined surface 254. This merging or transition can occur at the intersecting portion 247. This intersecting portion can form a continuation or extension of the surface of the inclined surface 254. The last thread 246 can also transition at the transition region 215 into the inclined surface 254. As can be seen in FIG. 19, the leading portion 248 is adjacent the chisel edge 256, but does not form a direct extension of that chisel edge 256. The surface area of the inclined surface 256 thereby can be increased by the area corresponding to the intersecting portion 247.

The operation of the second alternative embodiment in FIG. 19 is similar to that of the embodiment in FIGS. 12-18. For example, the leading edge 248 and/or last thread 246 acts to scoop up material and transfer it to the surfaces of the threads so that that material can be augured up and out of a pre-bored hole created by the chisel edge 256. Moreover, the chisel edge 256 and respective components can operate like a chisel break point as described in the embodiments above. In some circumstances, however, the scooping action by the leading portion 248 can be slightly less than that of the embodiments described above due to the leading portion 248 not being disposed at the point of contact with the bottom of the pre-bored hole or the material, that is, directly adjacent the end forming an extension of the chisel edge 256. Optionally, if desired, the leading portion 248 can be moved to the lower most extremity of either of the inclined surfaces 252, 254. The chisel edge of this fastener surface can also include a chisel brake point as described above.

III. Third Alternative Fastener Embodiment

Figure 20:
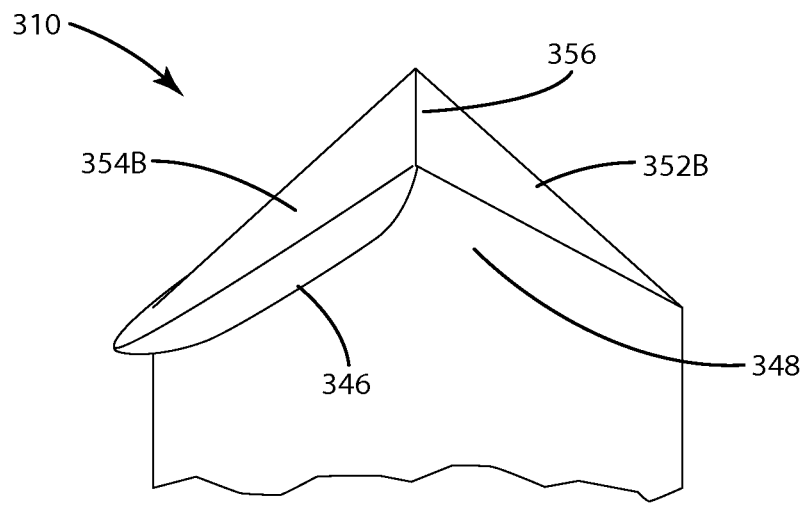
FIG. 20 is an enlarged side view of an end of a third alternative embodiment of the fastener.
Figure 21:
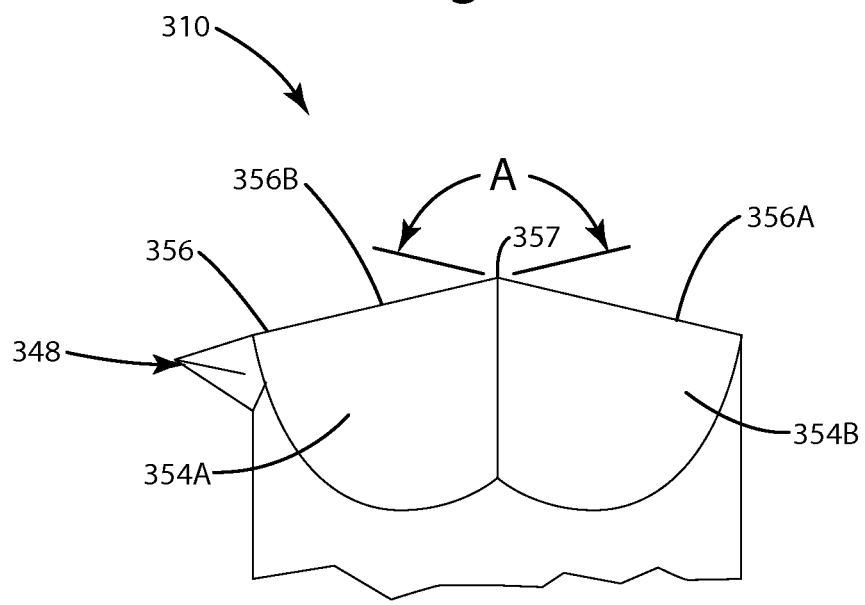
FIG. 21 is another enlarged side view of the end of the third alternative embodiment of the fastener.

A third alternative embodiment of the screw is illustrated in FIGS. 20 and 21 generally designated 310. This embodiment is similar to the above embodiments in construction and operation with a few exceptions. For example, the chisel edge 356 includes a small apex or point 357 at which the chisel edge sub portions 356A and 356B intersect. In this chisel edge construction, the chisel edge sub portions can be at an angle A relative to one another. This angle can generally be an obtuse angle, that is, greater than 90° and optionally less than 180°. In this embodiment, the inclined surfaces can be divided into sub portions 352*a* and 352*b*, and 354*a* and 352*b*, or additional sub portions if desired. These sub portions can include the negative rake angles or other angles of the inclined surfaces of the embodiments described above. The screw of this embodiment also can include a last thread 346 with a leading portion 348 that merges or transitions into one or more of the inclined surfaces, generally forming an extension of those surfaces, the chisel edge, or other components of the end of the screw. Further, the chisel edge of this fastener can include a chisel brake point and can operate like the embodiments described above.

IV. Installation Tools

As mentioned above, a tool can be used to start and advance the above mentioned fasteners, or other fasteners, into one or more work pieces to join those work pieces in the manners explained above. For example, a tool can be used to start a screw and subsequently advance the screw through the side of a board and subsequently into an underlying or adjacent joist or other structure.

Figure 22:
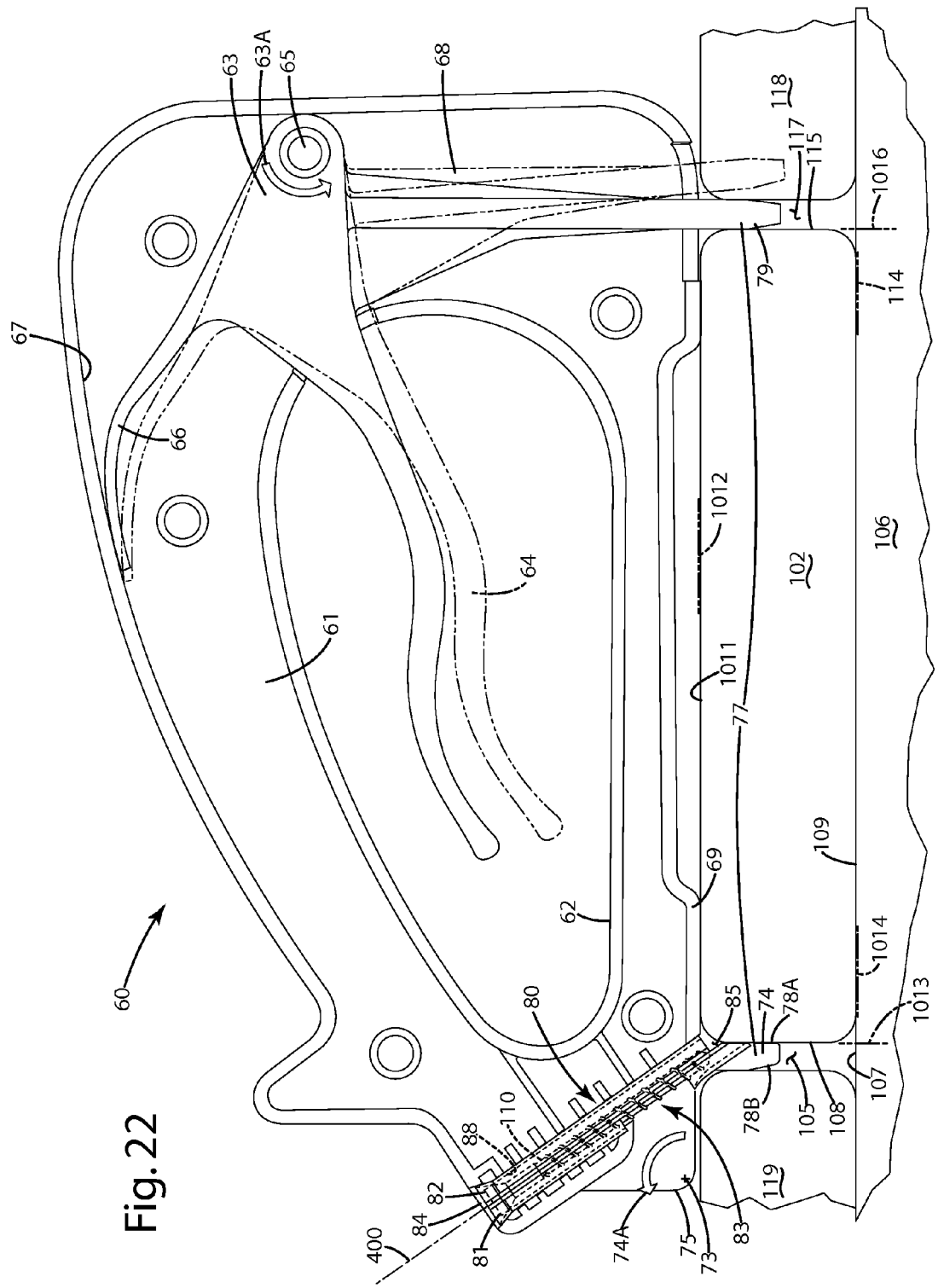
FIG. 22 is a side view of a current embodiment of a fastener installation tool.
Figure 23:
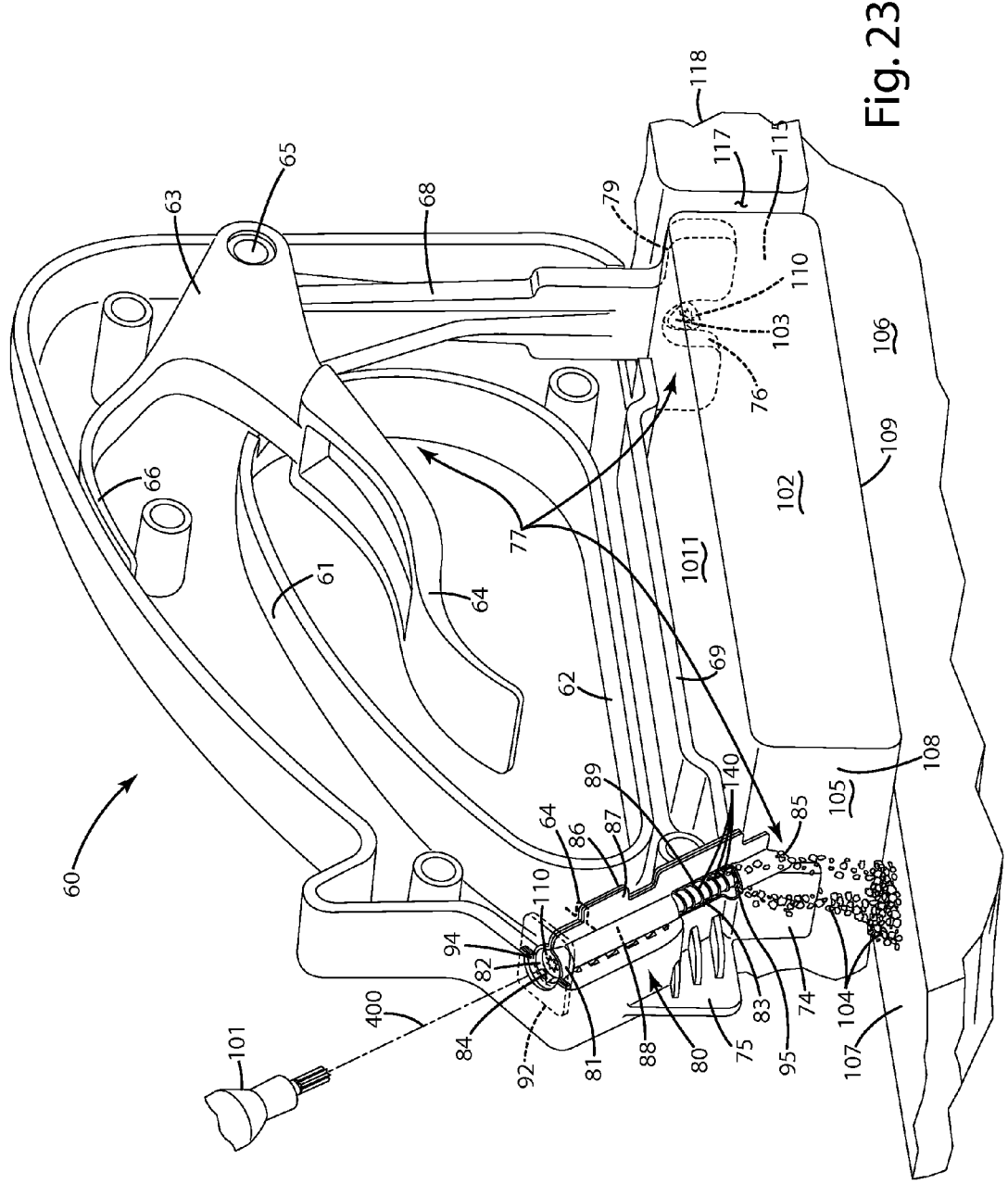
FIG. 23 is an end perspective of the fastener installation tool.
Figure 24:
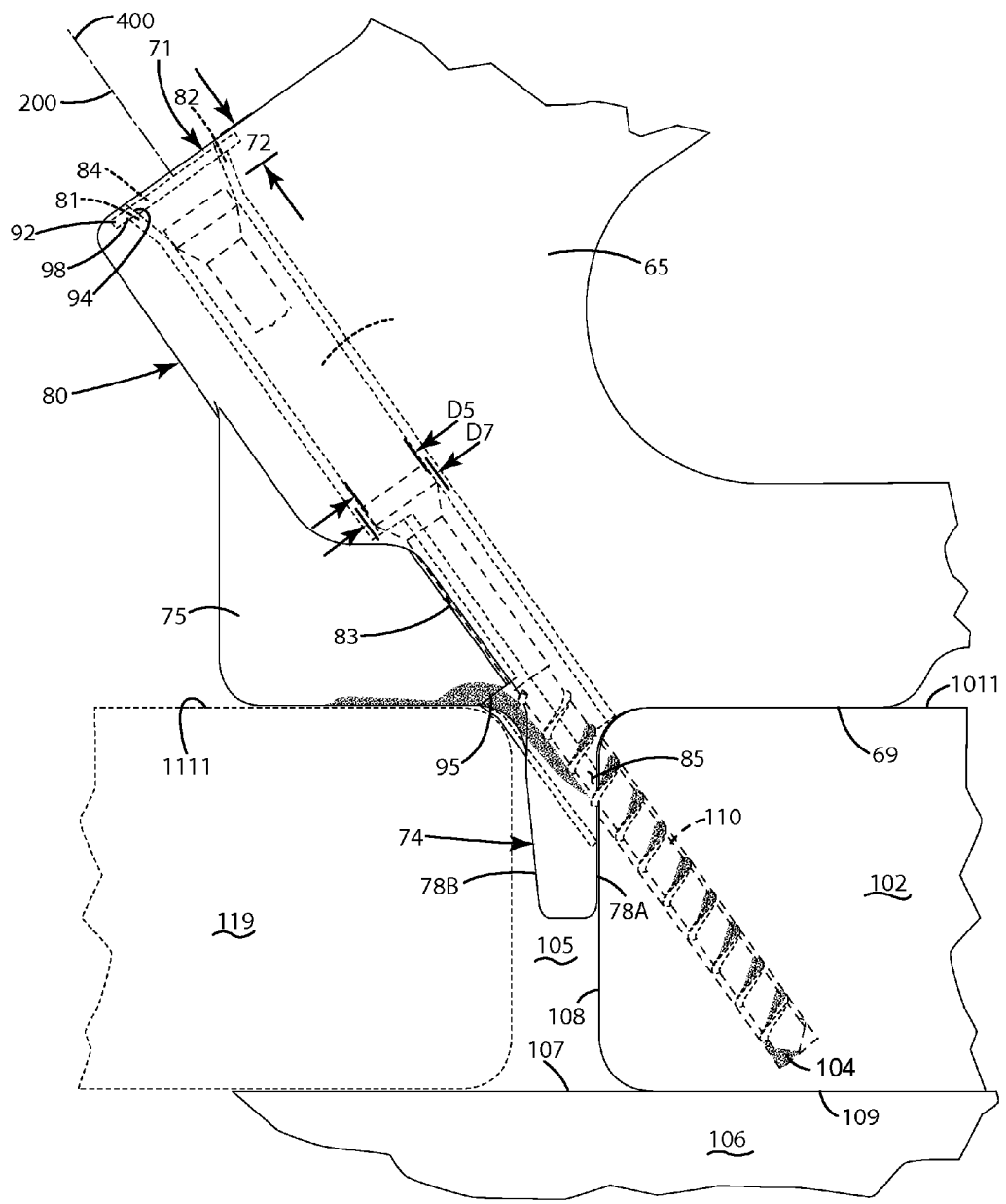
FIG. 24 is a close up view of the fastener installation tool in use installing a fastener.

A current embodiment of a tool suitable for such a fastener installation is illustrated in FIGS. 22-24, and generally designated 60. As shown there, the tool 60 can include a frame 62 including a handle 61, a guide 80 and an optional clamping assembly 77. The frame 62 can include a bottom surface 69 that is adapted to engage a top surface 1011 of a work piece 102. This work piece can be a board or any other type of structure described herein. The tool can be used to install a fastener 110 as described above through the first work piece 102 and into the second work piece 106.

Generally in the embodiments shown, the work piece 102 can include a first surface, also referred to as a side surface 108 that lays in a first plane 1013. Opposite the first surface or side surface 108, on the opposite side of the work piece, can be an opposing side surface 115, or fourth surface, that lays generally in a fourth plane 1016. The work piece 102 also can include a third surface or top surface 1011 that generally lies at least partially within a third plane 1012, and a second surface or bottom surface 109 that generally lies in a second plane 1014 that is parallel to and on the opposite side of the work piece from the top surface 1012. The first surface 108 and fourth surface 115 can be generally perpendicular to the top 1011 and bottom 109 surfaces of the work piece 102.

The guide 80 of the tool 60 can generally define an angled bore 84 that is positioned in a non-orthogonal angle, or generally angularly offset from 90°, relative to the side surface 108 of the first work piece 102 when the tool 60 readied for advancing the fastener. The angled bore can extend from a first opening 84 to a second opening 85. The first opening can be configured to receive a fastener and generally operate as an entrance into which a fastener can be inserted into the tool 60. The second opening 85 can serve as an exit through which the fastener exits the tool 60 as it advances into the work piece 102.

The angled bore 88 in this embodiment, and in particular the guide 80, can include first and second guide plates 81 and 82. These guide plates 81 and 82 can be constructed from stamped parts forming opposing halves of the angled bore. The stamped parts can be metal, such as steel, stainless steel or other metals, or optionally composites or polymers. The stamped metal halves cooperate to form the angled bore 88.

As shown in FIG. 23, the guide plates 81 and 82 can include opposing tabs 86 and 87 (FIG. 23) that extend radially outwardly generally from the angled bore and/or the axis 400 of the angled bore. These tabs 86 and 87 can be positioned in the frame 62 so that they engage and contact one another. To join the tabs 86 and 87, the tabs can be inserted in slots 64 defined by certain portions of the frame 62. When placed in the slots, the guide plate tabs 86 and 87 can be held in close proximity to one another to generally secure the opposing halves 81 and 82 of the guide 80 together. Of course, where other constructions are desired, the guide plates 81 and 82 can be of a unitary construction such that the tabs 86 and 87 are eliminated. For example, in the embodiments described below, the angled bore 84 can simply be defined by a unitary structure screw guide. Alternatively, the plates 81 and 82 can be joined with fasteners projecting through or otherwise fastening the tabs 86 and 87.

Optionally, a protective plate 92 can be included with the tool 60. This protective plate 92 can be placed adjacent the first opening 84 to generally protect the uppermost edges of the guide plates 81, 81 from damage when the fastener 110 or a portion of a tool 101 is inserted in the angled bore 88. For example, the protective plate 92 can define a plate bore 94, which can be generally aligned with and/or centered on the axis 400 of the bore 88. The inner edge of the protective plate 92 adjacent the plate bore 94 can extend over and at least partially or fully cover the edges 98 of the respective guide plates 81 and 82. With the inner edge of the protective plate covering the edges of the guide plates, a fastener 110 or portion of the tool 101 can be guided or generally deflected so it does not engage those edges 98. In turn, this can prevent chipping, marring, breaking or other damage to those edges 98 and more generally to the guide plates with the fastener or tool. Of course, if desired, the guide plates themselves can include integral protective plates extending therefrom, or the protective plate 92 and similar devices can be absent from the construction altogether.

The frame 62 and the other various components of the tool 60 can be constructed from stainless steel, steel, other metals, composites and/or polymers. For example, as mentioned above, the guide plates 81 and 82, as well as the optional protective plate 92 can be constructed from steel, while the like components of the frame 62, such as the handle 61, the secondary handle 64 and the spacers 74 and 79 can be constructed from a polymeric material such as a high impact resistant plastic.

Referring to FIGS. 22 and 23, the guide 80 and/or frame 62 can include a spacer 74 that extends downwardly from the bottom 69 of the frame 62. The spacer 74 includes opposing side surfaces 78A and 78B. The side surface 78A can be configured to engage and rest immediately adjacent or up against the side surface 108 of the work piece 102. The opposing side surface 78B of the spacer 74 can be configured to be positioned adjacent another work piece 119 positioned near the first work piece 102, as described below.

The spacer 74 can project downwardly or generally protrude into a space 105 that is immediately adjacent the side surface 108 of the work piece 102. This space 105 can be defined by the dimension or width of the spacer 74 between the side surface 78A and the second side surface 78B. Of course, if other types of spacers or indexing elements are desired, they can be included and extend outwardly from the bottom surface 69 of the frame 62. For example, the spacer 74 can be configured to fit in the space 105 that is immediately adjacent the side surface 108 of the work piece 102 as shown. The spacer can be of a dimension or width, for example about ⅛ to ½, or about ¼ of an inch, to effectively set the preselected spacing or distance between a first work piece 102 and a third work piece 119 as shown in FIG. 22. Alternatively, the spacer can be dimensioned to precisely fit between already preinstalled work pieces or boards to further fasten those boards to underlying substructures or improve the fastening of the boards to other structures.

The side surface 78A of the spacer 74 also defines the second opening 85 of the angled bore 84 through which a fastener is adapted to exit. Further, the guide plates 81 and 82 can extend downwardly to the opening 85 and terminate at or adjacent the side surface 78A. The second opening 85 can be positioned a preselected distance away from the bottom surface of the frame 62 in certain applications. Although as shown the second opening 85 opens out the side surface 78A of the spacer 74, the angled bore alternatively can be constructed so that it opens out the bottom surface 69 of the frame 62 (not shown).

With the illustrated configuration of the guide 80 and the spacer 74, the angled bore 84 extends through these elements and generally through the space 105 immediately adjacent the side surface 108 of the work piece 102. The angled bore 88 can substantially encase or otherwise contain a fastener 110 all the way up to the side surface 108 of the work piece 102. Optionally, the opening 85 can be placed within about ¹⁄₁₆ to about ⅛, further optionally about ¹⁄₁₆ to about ¼ of an inch from the side surface of the work piece 102. Further optionally, the opening 85 can be configured so that at least a portion of it lays within a plane that is generally parallel to the plane 1013 in which the side surface 108 of the board lays.

Accordingly, when the fastener 110 is rotated, even when its end includes a chisel break point or other construction, that end is restrained and generally contained in the bore 88, so that it does not wobble excessively, even when beginning to penetrate the side surface 108 at the angle as illustrated or described in the embodiments of the fastener above. This can provide a precise alignment of the fastener 110 into the side surface of the work piece 102 and into or through other surfaces of that work piece 102 and underlying work pieces 106.

The fastener guide 80 can also be configured to include a material ejection port 83 that is in communication with the angled bore 88. As shown in FIG. 24, the guide plate 81 can define a material ejection port 83. The material ejection port 83 can be a hole that is located between the first opening 84 and the second opening 85. The precise location of the material ejection port 83 and its dimension can be selected based on the material to be augured or otherwise ejected or evacuated out from the angled bore 88. As illustrated, the material ejection port is positioned generally above the bottom surface 69 of the frame 62, and can be about ½" long. Of course, it can be of other dimensions, for example about ⅛ to about ¼ of an inch in length. Generally, it can be of a dimension that is sufficient to allow material augured by a fastener 110 to eject from the port 83.

The material ejection port 83 can be dimensioned and located so that it is defined on the underside of the angled bore 88 so that the material drops out from the bore via gravity through the port. The material ejection port 83 can be large enough to drop out fibers or other material augured from the work pieces, yet small or short enough so that a screw inserted into the angled bore 88 from the first opening 84 will not have its end drop out from, or otherwise protrude, or get hung up in the ejection port 83 while the screw moves toward the second opening 85.

The material ejection port 83 can include a lowermost rim 95 as shown in FIGS. 23 and 24. This lowermost rim can be positioned so that it is located above the top surface 1011 of the work piece 102, and/or so that it is also located above the top surface 1111 of an adjacent work piece 119. With such a positioning of the lowermost rim of the material ejection port, material augured up through the angled bore can be ejected out from the bore generally above the top surface 1011, as well as the top surface 1111 if the work piece 119 is in place adjacent the work piece 102. In turn, the ejected material can freely flow out from the port over or adjacent the lowermost rim 95. It is noted that the lowermost rim may be considered to be above the top surface 1011 of a particular work piece merely because it is above the plane in which the surface is located. For example, the lowermost rim 95 in FIG. 24 can be considered above the top surface 1011 even though it is not directly over that top surface 1011. Optionally, in certain applications, the material ejection port can be eliminated from the tool.

The material ejection port also can be housed between opposing frame flanges 75 which extend from the rearward portion of the frame 62. These flanges 75 can extend outward a sufficient distance to generally conceal the material ejection port 83. If desired, the flanges can form and include a pivot axis 73. The frame itself 62 can pivot about this pivot axis 73 in the direction of the arrow 75A after a fastener has been sufficiently advanced and installed in a work piece 102 to fasten or join it with another work piece 106. By pivoting the frame about the pivot axis 73 and in general having the frame rotate on the rearward portion of the flanges 75, undue stress and forces on the spacer 74 can be reduced or eliminated. This can add to the longevity of the spacer, particularly where it is constructed from a polymer material. Of course, the flanges 75 can be eliminated altogether if desired.

With further reference to FIG. 23, the material ejection port can include edges 89 constructed to function as wipers to wipe or pull material 104 entrapped within the threads 140 of the fastener 110 out therefrom. The edges can be configured to extend generally along or parallel to the axis 400 of the angled bore. Of course, the edges alternatively can be offset at a predetermined angle relative to that axis 400 as desired. The edges can be somewhat sharpened or otherwise disposed at a right angle relative to the rotation of the fastener 110. In this manner, any excessive material that protrudes from beyond the crests of the fastener threads can catch or otherwise engage the edges 89. In so doing, the edges can dislodge the material 104 from the threads and cause it to further drop out with the assistance of gravity from the port 83. Where the material 104 is taken from a work piece constructed from a composite or polymer or an extremely fibrous material, the wiper edges can act to wipe these materials from the fastener as it rotates the angled bore 88 to prevent or impair binding of the fastener 110.

Generally, the wiper edges can be generally linear, but of course can be tapered or curved as desired. Further, the edges can be positioned somewhere around the circumference of the fastener 110 so that as the fastener rotates at least a portion of it passes by and is capable of engaging augered material associated with the fastener against the edges. In some circumstances, where the material is known not to be of a type that would excessively bind the rotation of the fastener 110, the edges can be absent. For example, the material ejection port can extend all the way around the circumference of the angled bore 88.

The material ejection port can serve to remove or eject bored material from the angled bore to reduce some or all of the amount of material pulled back into the pre-bored hole by the fastener, which in some cases can cause damage, such as splitting or bulging of the work piece in the area surrounding the fastener. For example, the material ejection port can enable material augered up from the work piece to be ejected away from the threads and shaft of the fastener. In cases where the material ejection port is absent, or otherwise does not facilitate ejection of the material from the bore, and the head of the fastener is dimensioned so that it is almost the same dimension as the angled bore, the head might capture and drag all the pre-bored material back into the hole as the head advances toward the hole. That material would be captured in the space between the shaft and threads, and the walls of the angled bore, with the head acting like a cap or piston to pull the augered material between it and the work piece back into the pre-bored hole. With the material ejection port, the material augered or removed from the hole is ejected from the bore so that there is minimal, if any, augered or removed material for the head to pull into the hole. In turn, this can reduce the likelihood of damage to the work piece around the area of the hole caused by the material entering the hole, possibly along with the components of the fastener. Of course, in certain applications where material might not readily be pulled into the hole by the fastener, the material ejection port can be eliminated.

As shown in FIG. 24, the guide 80 optionally can include a beveled portion 83A adjacent the lower extremity of the port 83. This beveled portion can generally increase the internal area of the bore adjacent the port 83. The bore also can serve as a ramp to assist the material 104 being ejected out from the bore 88 through the port 83. The angled bore 88 can have an internal dimension D7, which can be in the form of a diameter about 0.1 to about 0.4 inches, optionally about 0.15 to about 0.75 inches, or other dimensions greater or less as desired. In general, the diameter D7 can be slightly larger than the dimension than the head D5 of the fastener 110. For example, the dimension of the diameter D5 can be about 0.001 to about 0.05 inches less than the diameter D7 of the angled bore 88. Other tolerances can be suitable as well, depending on the application. The diameters D5 and D7 can be matched so that the head of the fastener does not excessively wobble or move other than rotationally and/or along the axis 400 of the angled bore 88. This in turn can reduce, impair or otherwise prevent wobble of the fastener 110 as it is advanced into the work pieces. It also can prevent or impair the axis of rotation 200 of the fastener 110 from becoming misaligned or substantially non-parallel with the axis 400 of the angled bore 88, which also can be considered the advancement axis of the fastener 110. In certain circumstances where the axis 200 of the fastener 110 becomes significantly deviates or is at a substantial angle relative to the axis of advancement 400 of the angled bore 88, it is possible that the portions of the fastener can bind against the material surrounding the second opening. In limited circumstances, this can impair advancement and/or rotation of the fastener and/or otherwise impair the functioning of the tool and its removal from the respective work piece.

The angled bore 88 as shown in FIGS. 22 and 24 can be configured so that it is of a length that closely corresponds to the length of the fastener 110. For example, the length of the angled bore 88 can be about 1.9 to about 2 inches in length, while the length of the screw is about 1.5 to about 1.9 inches in length. Of course, other lengths of the bore and fastener could be selected and still function suitably for other applications. With this particular embodiment, where the fastener is slightly shorter than the length of the angled bore 88, the fastener 110 can be substantially encased within the angled bore 88 immediately before it is advanced into the work piece. In this manner, the features of the fastener can be restrained or otherwise contained within the bore to prevent excessive wobble. For example, the end of the fastener can be closely constrained as it begins to penetrate the side surface 108 of the work piece 102.

Optionally, the angled bore can be about 0.01 to about 1.0 inches, further optionally about 0.25 inches longer than the fastener 110. Accordingly as shown in FIG. 24, when the fastener is positioned in the angled bore 88 before it is advanced into the work piece, as shown in broken lines in FIG. 24, the head of the fastener 110 can be a preselected distance 72 inward from the portion of the frame 71 surrounding the angled bore 88 and in particular the opening 84. Optionally, the angled bore 88 itself, in particular the guide plates 81 and 82 can include a slight frustoconical taper at or adjacent the first opening 84 extending outwardly to the surrounding portion 71 of the frame 62. With the head of the fastener 110 slightly disposed inwardly slightly from the surrounding surface, a user can quickly center a drive, such as a Philips or star drive feature associated with a drill, in the head of the fastener. The region of the angled bore 88 above the head of the fastener 110 can act to capture and guide the drive feature into the head more easily. Alternatively, if desired, the fastener 110 and angled bore 88 can be more grossly mismatched in length. For example, the fastener 110 can be longer than the angled bore 88 so that it protrudes outward beyond the surrounding portion 71 of the frame 62 a preselected distance in certain applications.

With reference to FIGS. 22-23, the tool 60 can also include a clamp assembly 77. This clamp assembly can include the first spacer 74 and a second spacer 79 spaced distal from the first spacer. The distance between the first and second spacers can be about the width or slightly larger than the width of the work piece into which the tool is designed to install fasteners. Further, this distance can be varied by operating the clamping assembly 77. For example, the second spacer 79 can be spaced about 5"-6" from the first spacer 74 and can be actuated to move closer to the first spacer 74 to close the distance between those elements to the precise dimension or width of the work piece 111 into which the fastener is to be driven. This can provide a clamping action to clamp the side surfaces 108 and 115 of the work piece 102 between these features of the tool. In turn, this can temporarily rigidly hold the guide 80 and/or spacer 74 in a fixed orientation relative to the board 102 and more particularly hold the axis 400 of the bore 88 in a desired alignment with the side surface 108 of the work piece 102. In turn, the fastener can be rotated and advanced precisely into a desired location through the side surface 108 and into and through the first work piece and/or second work piece. More generally, the clamp assembly 77 can hold the tool 60 in a desired orientation and aim the fastener 110 precisely into and/or through the work pieces.

Optionally, the clamp assembly 77, or more generally the tool when no clamp assembly is included, positions the first spacer side surface 87A immediately adjacent the side surface 108 of the work piece. The second opening 85 can also be placed immediately adjacent the side surface 108 of the work piece. In such a configuration, there may be little or no gap or void between the side surface and these elements. Accordingly, when a screw, for example, an embodiments of the fasteners described herein, is rotated in the angled bore, it is rotationally constrained right up to the side surface into which it is to advance. Where the end of the screw is configured to pre-bore a hole, this rotational constraint can offset the tendency of the screw end to wander or wobble when it is rotated against the work piece, and in turn assist in starting the screw in the work piece.

The clamp assembly further includes an arm 68, a secondary handle 64 and a biasing element 66, as shown in FIGS. 22 and 23. These elements can all be joined with a common element 63. The common element 63 can be rotatably mounted on a pivot axle 65. The arm 68 can extend downwardly through a portion of the frame 62 and be connected with the spacer 79. The secondary handle 64 can extend at another location outward from the common element 63 and can be disposed generally adjacent the handle 61. The secondary handle 64 can be moveable relative to the handle 61 and generally relative to the frame 62. The secondary handle 64 can be considered movably joined with a frame 62 and adapted to actuate the clamp assembly and move the second spacer 79 to effectuate a clamping action on the work piece 102.

Optionally, the secondary handle 64 can be spaced a preselected distance from the handle 61 so that a user can manually grasp simultaneously both the handle and the secondary handle and squeeze those elements so that they move closer to one another. In so doing, the secondary handle 64 rotates the common element 63 about the pivot axis, which in turn rotates the arm 68 and correspondingly the second spacer 79 toward the first spacer 74 to provide a clamping action on the work piece 102.

The secondary handle 64, as well as the arm 68 and spacer 79 can be biased toward the configuration shown in broken lines in FIG. 22 by the biasing element 66. This biasing element can be in the form of a biasing arm 66 that, when installed in the frame, can engage the interior surface 67 of the frame 62 and accordingly urge the common element 63 in the direction of the arrow 63A shown in FIG. 22. In turn, this can urge the secondary handle 64 and the arm 68 to the configuration shown in broken lines in FIG. 22 as well.

To overcome this biasing action, a user can manually grasp a secondary handle 64 and pull it toward the handle 61, which will cause a clamping action on the side surfaces 108 and 115 of the work piece 102, thereby holding the angled bore 88 and generally the axis 400 of the bore in a desired orientation relative to the side surface 108 of the work piece 102.

Other biasing elements can be used to provide the clamping action of the tool 60 on the work piece 102. For example, instead of the biasing element 66 being preformed and engaged against the interior of the frame, a coil spring or leaf spring could be positioned adjacent the common element 63 to urge the arm 68 and second spacer 79 in a desired direction about the pivot 65. Optionally, the pivot could have a coil spring built between it and the common element to provide a biasing force. Further optionally, the biasing element 66 could urge the arm and the spacer in a direction about the pivot axis 65 in the direction opposite that shown by the arrow 63A in FIG. 22. In such a construction, the user would then move the secondary handle 64 away from the handle 61 to open up the distance between the first spacer 74 and the second spacer 79. With such an alternative configuration, upon installing the respective spacer on the opposing side surfaces of the work piece 102, the user could release the handle so that the biasing element urges the respective spacers to move relative to one another and provide a clamping action on the work piece 102.

With reference to FIG. 23, the second spacer 79 can define a recess or hole 76 therein. This recess can extend all the way through, or only partially through, the second spacer 79. This recess 76 can be configured to straddle or otherwise extend around a hole in which another fastener 110 is positioned. This can be helpful in cases where the area surrounding the hole 103 is slightly raised due to the boring of the hole 103 by the fastener, or where the fastener is not of the type that pre-bores a hole, or where the fastener excessively bulges out material in the area surrounding the fastener 110. The recess 76 generally surrounds the area so that the bulge in the material does not affect the dimension of the space 117 between the adjacent side surfaces of the respective work pieces 102 and 118. Accordingly, the spacer 79, even when overlapping bulged out material surrounding previously installed fasteners can be consistently spaced to provide a clean, even appearance in the spacing between the adjacent work pieces. Although shown in a generally U-shape, the recess or hole 76 can be of square, rectangular, triangular, or some other geometric shape sufficient to surround a fastener hole or fastener head on an adjacent work piece. Further, the recess 76 can extend farther up the arm 68 depending on the application.

Referring to FIGS. 22-24, a method for installing a fastener with the tool 60 to join work pieces will be briefly described. To begin, a first work piece 102 is provided where the first work piece includes a top surface 111 and opposing bottom surface 109, a first side surface 108 and an opposing side surface 115. The bottom surface 109 of the work piece is placed adjacent the upper surface 107 of the second work piece 106. As illustrated, the second work piece 106 can be, for example, a underlying joist or subfloor. The first work piece 102 can be a deck board or other board constructed from any suitable board material as described above.

If a previous work piece 118 is already fastened to the underlying work piece 106, the spacer tool 60 can be placed atop the work piece 102 with the bottom surface 69 resting adjacent that the upper surface 1011 of that work piece 102. The spacer 79 can establish a preselected spacing that is the equivalent of the dimension or width of the second spacer 79 between the work piece 118 and work piece 102 and in particular the side surfaces of those work pieces that are adjacent one another.

The tool can be positioned so that the first spacer 74, and in particular the first side surface 78A of the first spacer 74 is positioned adjacent the side surface 108 of the work piece 102. In so doing, the second opening 85 also is positioned adjacent that side surface 108, with the angled bore 88 and related advancement axis 400 aligned at a predetermined non-orthogonal angle relative to the side surface 108 and the plane in which the side surface 108 lays. The second opening 85 is located so that it is immediately adjacent the first side surface 108 of the work piece 102. To further secure and hold the angled bore 88 and opening 85 in these respective locations, a user can manually grasp the secondary handle 64. In so doing, the handle actuates the common element 63 rotating it about the pivot axis 65. This rotates the arm 68 and accordingly moves the second spacer 79 toward the first spacer 74. In turn, this can provide a clamping action to clamp the first work piece 102 between the first spacer 74 and the second spacer 79. As an example, the first spacer 74 can engage the first side surface 108, and the second spacer 79 can engage the other side surface 115.

A fastener 110 can be installed in the angled bore 88. Assuming the fastener is an equal or lesser length than the angled bore, the fastener can bottom out and engage the side surface 108 of the work piece 102. A small distance 72 as shown in FIG. 24 will be left above the head of the screw. A user can then advance a driving tool 101 toward the frame. Due to the recessed configuration of the fastener head in the angled bore 88, the tool can center within the angled bore 88 and come to rest in the drive feature of the fastener 110.

While holding the tool 60 in a clamped configuration, with the axis 400 along a desired line of advancement into the work piece 102, a user can actuate the drive tool 101 to rotate the fastener 110 as described with the fastener embodiments described above, or some other fastener as desired. The fastener 40 can be advanced along the axis 400 within the angle bore 88 so the fastener enters the first side surface 108 of the work piece 102 immediately after exiting the second opening 85 of the angled bore. The fastener then travels partially out the bottom surface 109 of the work piece 102. Thereafter the fastener continues to rotate and penetrates the upper surface 107 of the second work piece 106 and continues to advance until the head of the fastener is at a desired location, which can be within a pre-bored hole created by the fastener, or generally so that the head of the fastener is at least partially concealed from view from above and generally does not obstruct the positioning of another work piece adjacent the first work piece 102.

Where the fastener of the embodiments described above is used, as the fastener is advanced into the work piece 102, it pre-bores a hole, and the material 104 from that hole is augured or otherwise fed up the threads. The material is ejected or evacuated generally from the angled bore 88 through the material ejection port 83. This action is shown in FIGS. 23 and 24. Where the material ejection port 83 includes an edge 85 adjacent the material ejection port 83, that edge can scrape augured material off from the threads or the remainder of the fastener 110, and assist in evacuating that scraped material from the angled bore 88.

After the first work piece 102 is installed and joined with the second work piece 106 with the fastener 110, a third work piece 119 (FIG. 22) can be installed adjacent the first work piece 102, atop the second work piece 106. The tool can be moved to a position atop the third work piece 119 in a manner such as that used in connection with the first work piece 102. The first 74 or second 79 spacer, depending on the orientation of the tool 60, can establish the desired spacing between the first work piece 102 and the third work piece 119. A new fastener can be inserted in the angled bore as with the previous fastener described above. That new fastener can be advanced along the advancement axis 400 in a manner described above to install the new fastener in the third work piece 119 and second work piece 106 to join those work pieces together. The above process can be repeated at worksite to install multiple work pieces and join them with other work pieces.

Optionally, the tool 60 can be used to install multiple deck boards on underlying substructure subfloor or joists. The work pieces can be boards, which as used herein can include deck boards, porch boards or other boards constructed from wood, particle board, composites, polymers, plastics, metal or other materials as desired. In installing the fasteners and work pieces to join them together, the tool can provide a way to quickly and precisely align the fasteners with the respective side surfaces of the work pieces or boards and install them in a manner such that they are generally concealed from view when viewed from a viewer directly above. Further, the angled bore, and in particular the guide surrounding the angled bore extending upwardly above the upper surface of an adjacent work piece, can effectively prevent the threads of an advancing fastener from gouging, damaging or marring an immediately adjacent work piece as that advancing fastener is advanced into an adjacent work piece.

V. First Alternative Tool Embodiment

Figure 25:
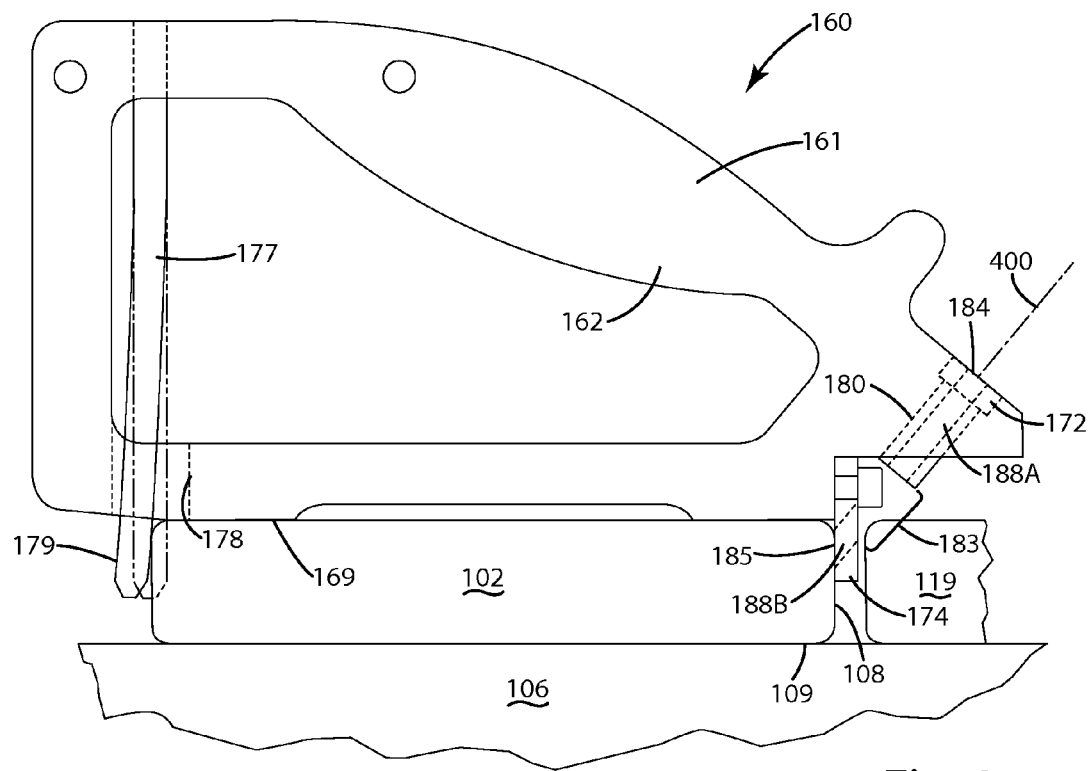
FIG. 25 is a side view of a first alternative embodiment of a fastener installation tool.
Figure 26:
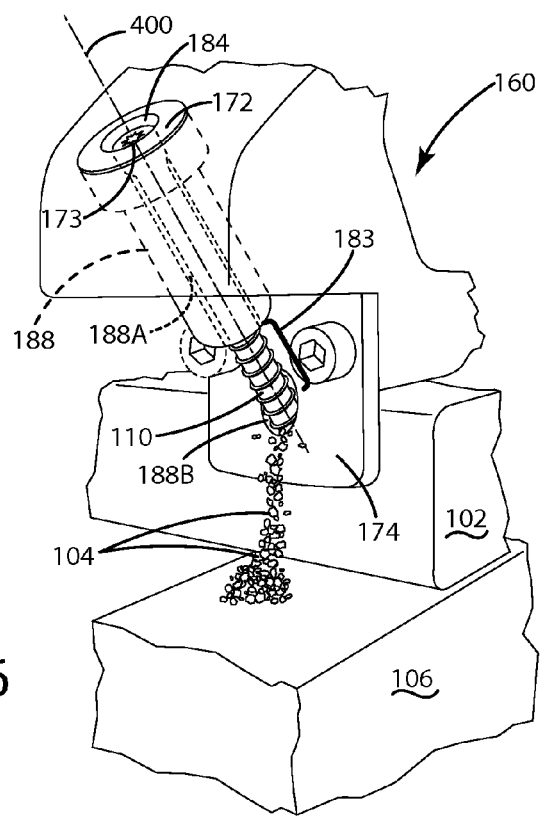
FIG. 26 is a close up view of the first alternative embodiment of the fastener installation tool in use installing a fastener.

A first alternative embodiment of the installation tool is shown in FIGS. 25 and 26 and generally designated 160. This embodiment of the tool is similar to the first tool embodiment described above with several exceptions. For example, the tool 160 generally includes a handle 161, a fastener guide 180, also referred to as a pilot element, and a spacer plate 174. The screw guide 80 can be installed in a frame 162 constructed from a polymeric or other material, which can generally be of a solid or hollow construction like that described in the embodiment above. The guide 180 can include an angled bore which includes first and second angled bore portions 188A and 188B. The first portion 188A can be defined by the primary guide element 172 and the second portion 188B can be defined by the spacer plate 174, which also can be referred to as a spacer. The primary guide element 172 can be configured at an angle relative to the spacer 174, however, the angled bore portions 188A and 188B can be aligned with and parallel to one another along the axis 400 of the angled bore. As with the embodiment above, this axis 400 can be configured and oriented at a fixed predetermined angle relative the side of the work piece 102 into which it advances a fastener 110. As with the above embodiment, a fastener 110 can be disposed within and generally circumferentiated by the primary 188A and secondary 188B portions of the angled bore 188. The primary and secondary portions can be dimensioned to be the same, and slightly larger than the outermost dimensions of the head and/or threads of the screw 110, so that as with the embodiment above, the screw can be constrained yet still rotate and advance along the axis 400 when driven and rotated by a powered or manual tool.

The primary and secondary portions 188A and 188B of the angle bore can be separated from one another by a gap 183 formed therebetween. This gap can also be referred to as a material ejection port and can operate similar to the material ejection port described in the embodiments above. For example, material 104 that is scraped or pre-bored from a work piece 102 and augered up the angled bore can be ejected or extracted out the port 183 to prevent or impair binding of the fastener as it advances or rotates.

Although the material ejection port 183 is shown as being formed by separate elements, for example being formed between the spacer 174 and the primary guide portion 172, the gap can be replaced with an alternative structure. For example, the guide 180 and in particular the angled bore can extend all the way to the location adjacent the surface of the side surface 108 of the work piece 102. In this alternative construction, the guide 180 can include a transversely drilled hole or a milled gap at least partially therethrough to allow the removed material 104 to escape from the angled bore 188 as shown in FIG. 26. Optionally, the end of the guide 180 adjacent the work piece 102 can be at an angle that corresponds to the surface of the work piece. Alternatively, the end of the guide element can terminate at a plane that is orthogonal to the axis 400.

As shown in FIGS. 25 and 26, the spacer 174 can be in the form of a plate that is rigidly attached to the frame 162 with screws or other fasteners so that it does not move laterally or vertically relative to the remainder of the guide element 180 and/or the work piece as the fastener 110 is advanced through the tool 160. Accordingly, the features of the tool steadily aims the fastener toward a desired location on the side of the work piece 102, and constrains it, regardless of wobbling forces that are generated by the fastener engaging the work piece 102, as with the embodiments above.

As illustrated in FIG. 25, the tool 160 also can include a second spacer 179. This spacer 179 can be mounted to an arm 177 that is further joined with a frame 162. The spacer can establish a gap between adjacent work pieces, much like that of the spacer in the first tool embodiment described above. The arm 177 and spacer 179 can project through a slot 178 that is defined in a portion of a frame 162. The spacer 179 can extend beyond the bottom surface 169 of the tool into a corresponding space between adjacent work pieces. The spacer 179 optionally can be adjustable, moving within the slot 178 to accommodate work pieces of different widths. For example, the spacer 179 can move toward or away from the first spacer 174 on the opposite end of the tool 160. With this construction, the spacer 179 can set a gap between the first work piece 102 being fastened down by the tool and a second work piece immediately adjacent that work piece. Optionally, the arm can be tensioned or under force so that it is urged against the opposing side surface of the work piece 102. In such a manner, it can act like a clamp to generally clamp the work piece between the first spacer 174 and the second spacer 179. The clamping action, however, can be somewhat less than that of the other tool embodiments described herein.

VI. Second Alternative Tool Embodiment

A second alternative embodiment of the fastener installation tool is illustrated in FIGS. 27-30 and generally designated 460. The installation tool shown there is similar in construction and operation to the embodiments described above with several exceptions.

Figure 27:
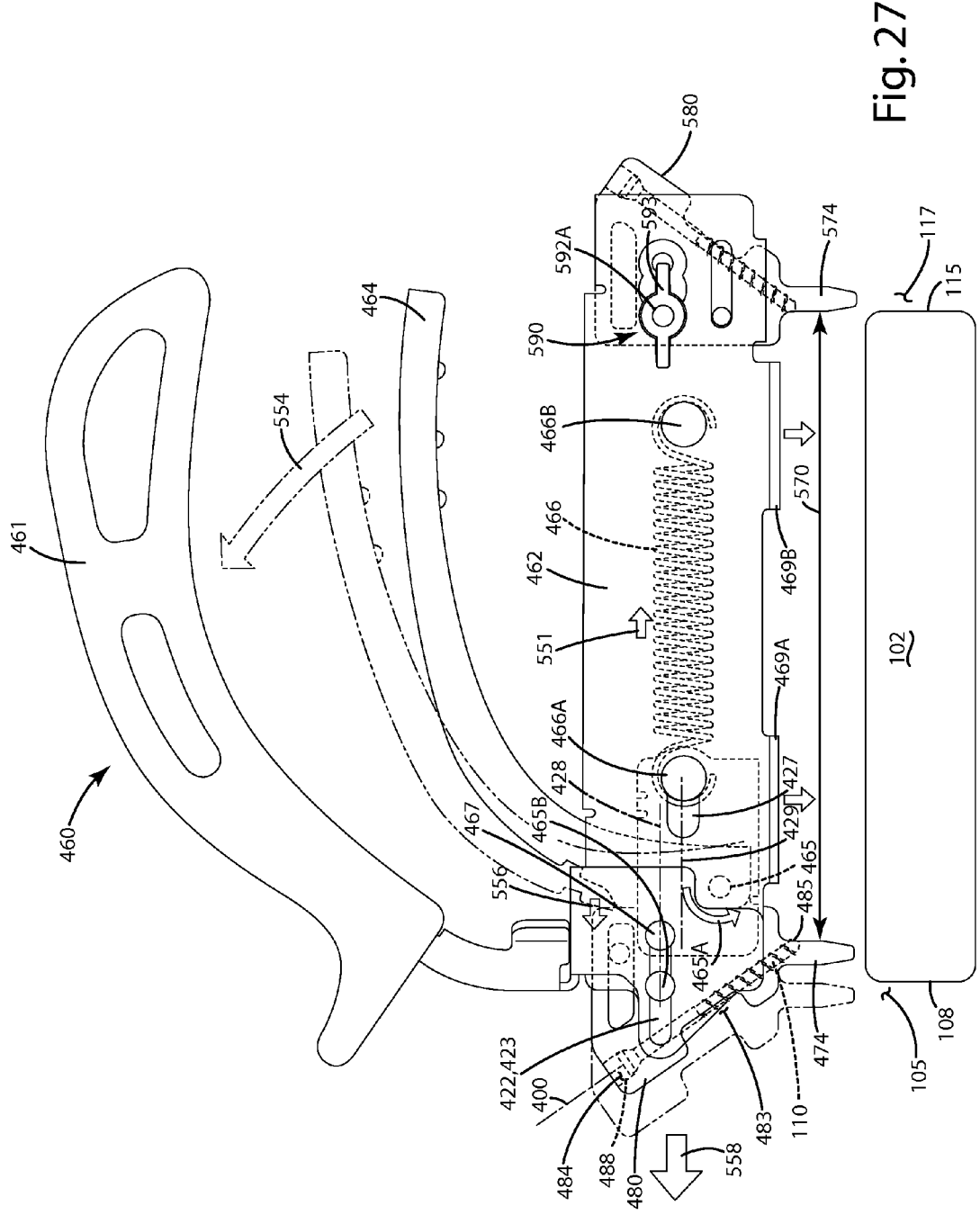
FIG. 27 is a side view of the second alternative embodiment of the fastener installation tool before being placed adjacent a work piece.

As shown in FIG. 27, the fastener installation tool 460 includes a handle 461 joined with a frame 462. The frame is joined with a first fastener guide 480 and a second fastener guide 580. A secondary handle 464 is operably joined to the frame 462 and a biasing element 466, as well as the first fastener guide 480. The secondary handle and biasing element 466 are adapted to move the first fastener guide 480 as described below.

Figure 31:
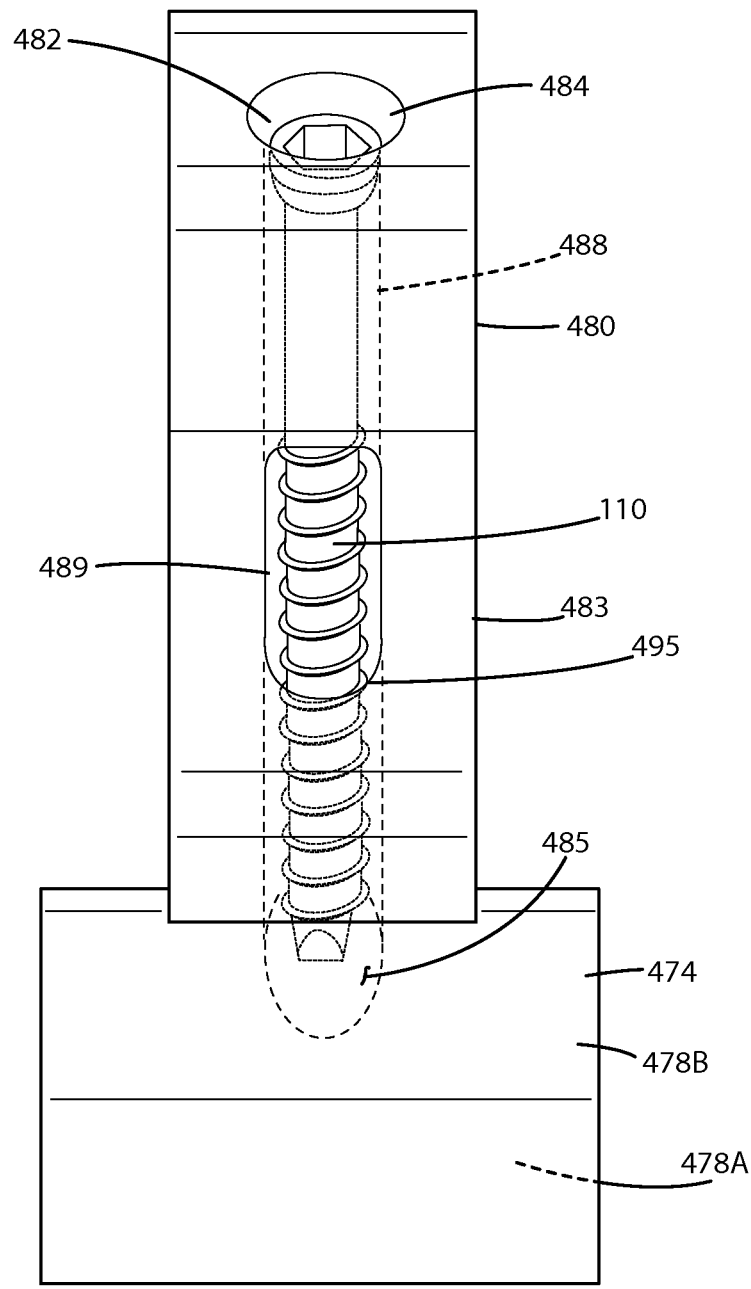
FIG. 31 is an enlarged end view of the fastener guide of the second alternative embodiment of the fastener installation tool.

Turning to FIGS. 27 and 31, the guides 480 and 580 are generally identical except reversed at opposite ends of the frame 462. Because the first and second guides are identical but simply reversed at opposite ends of the frame, only the first guide will be described here. The guide 480 is a monolithic structure that defines an angled bore 488 and further includes a or otherwise is joined with a spacer 474 that extends downwardly from the lower portion of the guide. The guide 480 can include a material ejection port 483 that is located between the first 484 and second 485 openings of the angled bore 488. The material ejection port can also include a lowermost rim 495 as described in the embodiments above. Further, like the embodiments above, the angled bore can be aligned along an axis 400 along which the fastener 110 can be advanced in a manner similar to the above embodiments. The guide 480 can include a beveled region 482 (FIG. 31) adjacent the first opening 484 to guide the fastener 110 into the angled bore 488. Likewise, the angled bore 488 can be of a length that is less than the length of the fastener 110 as described above so that before being installed into a work piece, the top of the head is slightly recessed inward from the outer portion of the guide element to facilitate guiding of a drive feature of a tool into the head of the fastener 110.

The guide 480 also can include or be joined with a spacer 474 that can be monolithic with a remainder of the guide. The angled bore 488 can extend downwardly through the spacer 474 so that the spacer 474 defines at least a portion of the angled bore 488. The angled bore 488 can terminate at the second opening 485 which can be defined by the side surface 478A of the spacer 474. As with the above embodiments, when the tool is used to install a fastener, this opening and thus the fastener can be positioned immediately adjacent the side surface 108 of the respective work piece 102.

The guide 480 can define additional apertures 489 (FIG. 30) through which pins 465B can fit to prevent excessive rotational movement of the guide 480 relative to the frame. These pins 465 can also be slidably disposed in a slots 422, 423 so that the pins can generally guide the guide 480 linearly in the direction of arrow 558.

Figure 28:
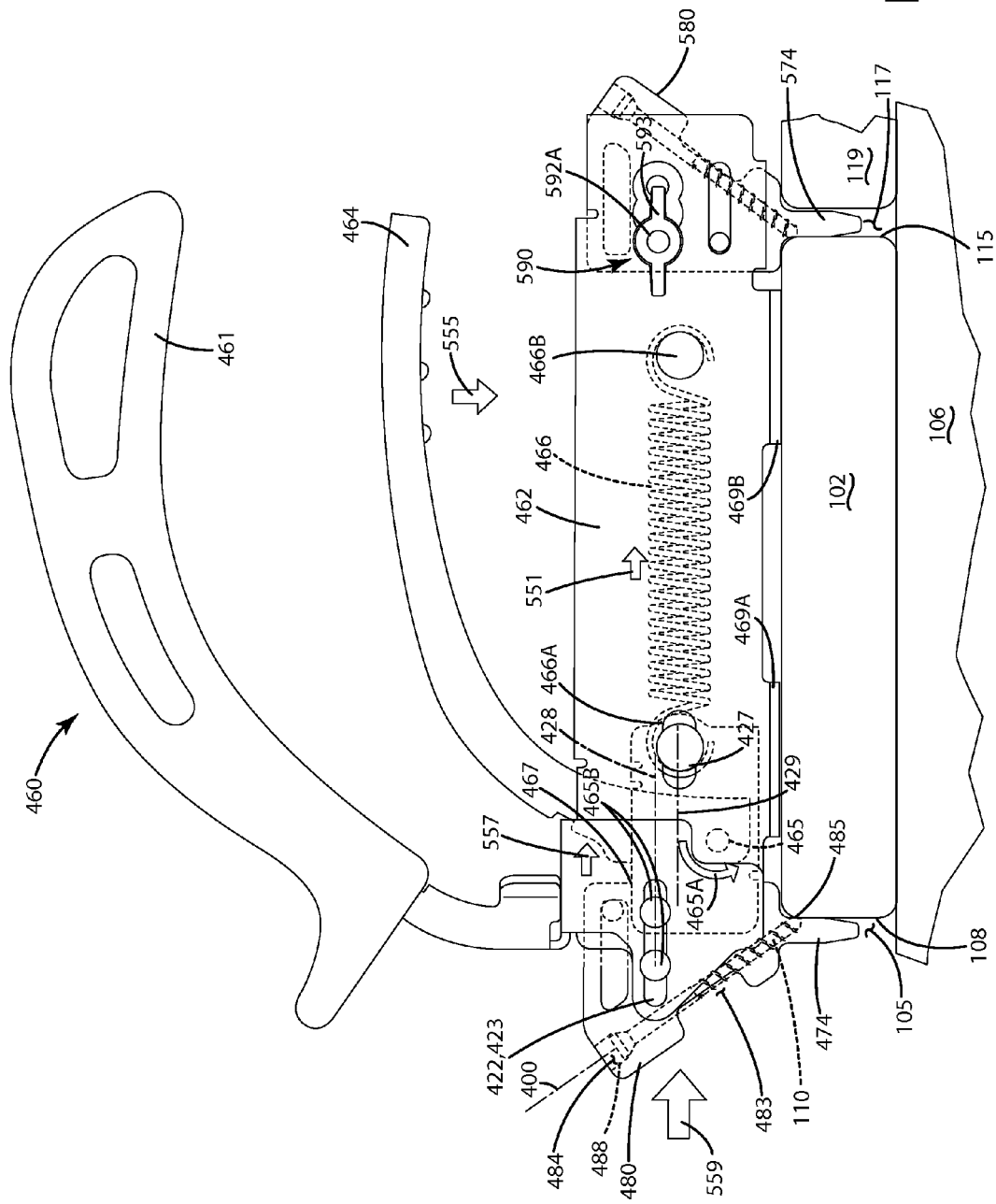
FIG. 28 is a side view of the second alternative embodiment of the fastener installation tool installed on a work piece.

The guide 480 can operatively be engaged against a portion of the secondary handle 464 at the handle portion 467. The handle 464 can be rotatable about the pivot axis 465. The movement of the handle 464, however can be constrained by the connection bracket 425, which can engage the secondary handle 464, and under the force of the biasing element 466, urge the handle in the direction 555 as shown in FIG. 28. The connection bracket 425 can be joined via a pin 466A with the biasing element 466.

The biasing element 466 can be in the form of a coil spring which is joined to the frame 462 in a relatively fixed location via a pin 466B at one end and is moveable with the pin 466A in the slot 427 at the opposite end thereof. Although shown as a coil spring, the biasing element 466 can be replaced with a variety of different biasing elements, for example leaf springs, elastomeric materials, pneumatic cylinders, hydraulic cylinders, solenoids, or other elements that can move the first guide 480 and/or second guide 580 relative to one another and/or the frame 462 to clamp or otherwise engage opposing surfaces of a work piece into which a fastener is to be installed within the tool 60.

Returning to FIGS. 27 and 30, the handle 461 can be joined with the frame 462 via a handle frame 420. This handle frame 420 can include an arm that extends upwardly into the handle 461. The handle frame 420 can also include slots 422 which can align with the slots 423 in the frame through which the pins 465B can project. The handle frame 422 can be fastened to the frame via fasteners such as rivets as illustrated. Of course other fasteners can be used, or the handle and handle frame can be monolithically formed with the remainder of the frame.

The frame 462 can include feet or tabs 269A and 269B which extend outward from the lateral sides of the frame a distance sufficient so that the width of the frame to the outer most portion of the feet on opposing sides is about 1.5 inches, which corresponds to the width of a common board used as a joist or underlying substructure. Of course, the feet can extend outward from the sides of the frame other distances, or may be alternatively folded inward depending on the particular application. Indeed, even if desired, the feet may be separate elements such as plates that are joined to the bottom of the frame and can extend outward a preselected distance from the frame depending on the desired application.

Figure 29:
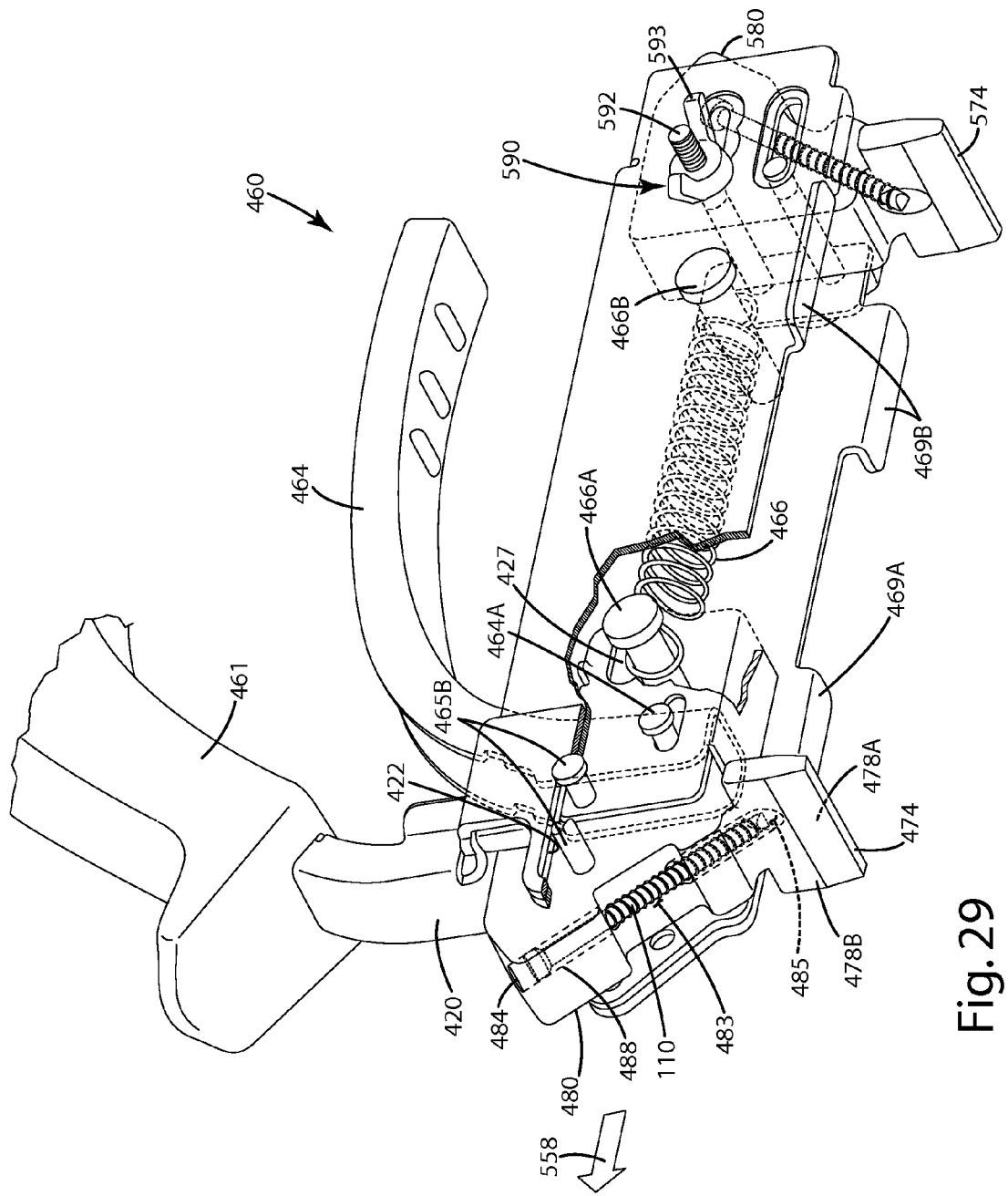
FIG. 29 is a bottom perspective view of the second alternative embodiment of the fastener installation tool.
Figure 30:
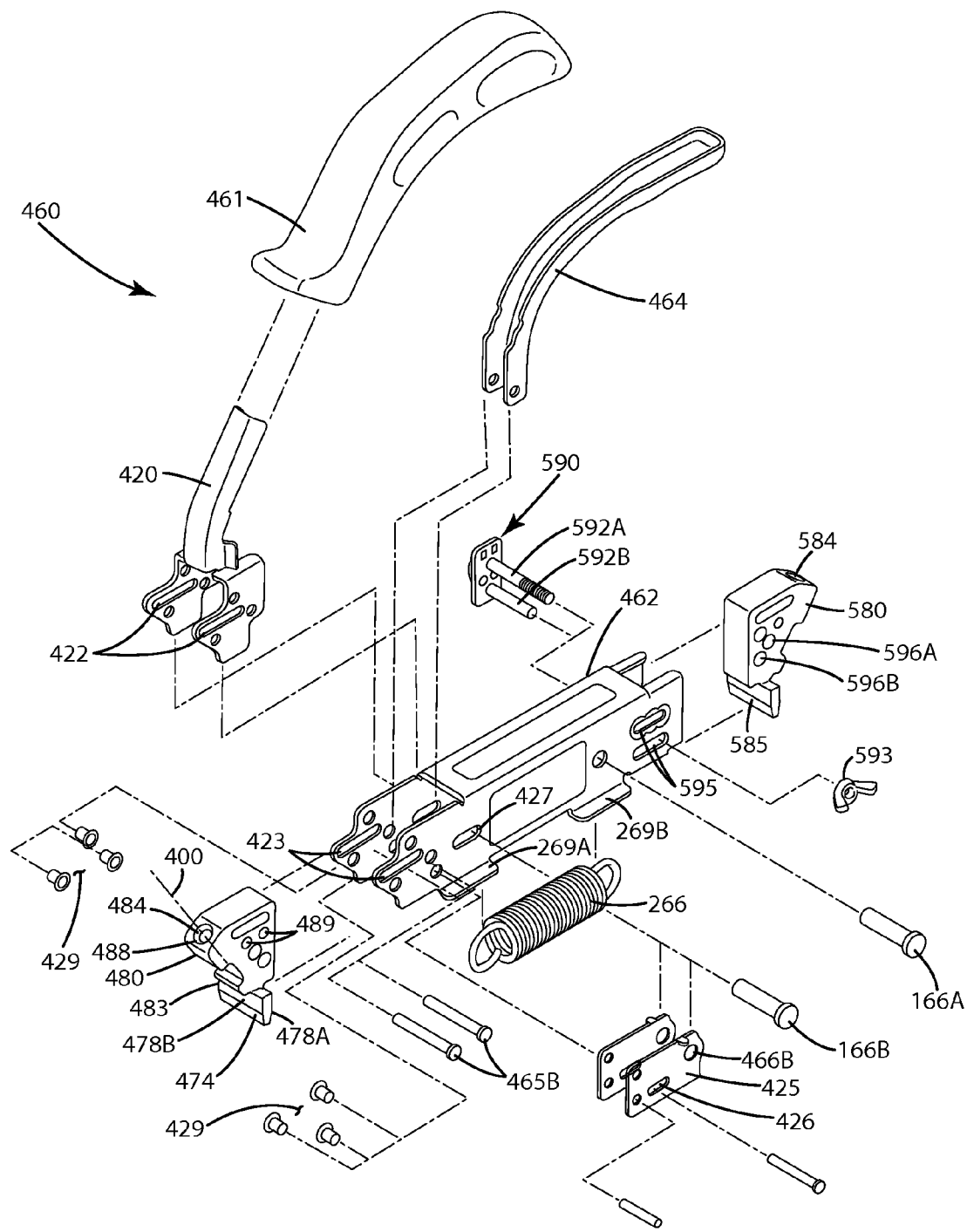
FIG. 30 is an exploded view of the second alternative embodiment of the fastener installation tool.

As shown in FIGS. 27 and 29, the pins 465B are located through apertures 489 in the screw guide 480. Pins 465 are also linearly guided via their registration within the slots 422, 423 defined by the handle frame and frame. In operation, the forward portion 467 of the secondary handle 464 can engage the pins 465B or the guide 480 itself and push the pins forward in the slot 422, 423. Accordingly, the guide 480, joined with the pins 465B moves forward in direction 558. This movement of the guide 480 is generally along the linear axis 428. Optionally, to impair rotation of the guide 480 as it moves along in the direction 558, the guide can also be guided directly or indirectly along the second axis 429, by the pin 466A sliding in the slot 427, with the connection bracket 425 rigidly joined with the guide 480 so that the guide 480 does not rotate relative to the frame while moving in the direction 558. A variety of different slots and guide configurations can be substituted for those shown to ensure the guide 480 moves linearly in direction 558 rather than rotates. Of course, if a pivoting action or rotation of the guide 480 is desired for a certain application, those guides and slots could be modified to include curvilinear portions or otherwise facilitate rotation of the guide as desired.

Operation of the installation tool 460 on a work piece 102 will now be described with reference to FIGS. 27 and 28. As shown in FIG. 27, the installation tool is initially in a retracted mode shown in solid, but reconfigured to an extended mode shown in phantom, to fit the work piece 102. In the retracted mode, the biasing element 466 has urged the guide element 480 inward toward the other guide element 580 so that the dimension between the spacer 474 and spacer 574 are dimension 570. To increase that dimension so the spacers 474 and 575 can fit on opposing sides 108 and 115 of the work piece 102, a user manually grasps the secondary handle 464 and draws it in the direction 554. The user can do this simply by squeezing the secondary handle 464 and handle 461 together.

The movement of the secondary handle 464 rotates it about the pivot 465 in the direction of the arrow 465a as shown in FIG. 27. In turn, this engages a portion 467 of the secondary handle 464 against the pins 465B which causes the pins to slide in the slots 422, 423. This moves the guide 480, which is joined with the pins 465B in the direction 558 outward from the frame 462. This also moves the first spacer 474 away from the second spacer 479. When the dimension 570 is increased so that the spacers 474 and 574 can be positioned and slide downward along the sides 108 and 115 of the work piece, the user may do so. In so doing, the lower surface, and in particular the feet 469A and 469B are engaged against the upper surface of the work piece 102. After the feet are engaged against the upper surface and the spacers 474 and 574 have been disposed in the spaces 105 and 117 immediately adjacent the respective sides 108 and 115, the user can release the secondary handle 464.

As shown in FIG. 28 this release is shown generally as movement of the handle 464 in direction 555. When this occurs, the biasing element 466 exerts a force 551 on the pins 466A. This pulls the connection bracket 425 so that the pin 466A slides in the slot 427, thereby allowing the connection bracket 425 to pull the guide 480 in the direction 559. This provides a clamping effect between the spacers 474 and 574, which in turn causes the tool to clampingly engage the work piece 102. With the work piece clamped between the spacers, the angled bores 488 and 588 of the guides 480 and 580 are aligned along the respective advancement axes, and the side surfaces of the respective spacers are positioned against the respective sides of the work piece. Accordingly, the fasteners can be rotated and advanced in the respective angled bores of the respective guides and installed in a manner similar to that described in the embodiments above. After the fasteners are sufficiently installed, the secondary handle 464 can again be engaged to move the spacer 474 away from the spacer 574 to release the clamp on the work piece. The tool 460 can then be removed from the work piece. After the tool is removed, another work piece can be installed adjacent the work piece 102 and the process can be repeated with the tool to install additional features.

The above clamping mechanism of the tool 460 utilizing the guide 480, the secondary handle 464 and related mechanisms, can provide fine adjustment of the tool to accommodate boards generally of the same nominal dimensions but which may have variations due to quality of inconsistency of those boards. For example, the adjustment with the handle 464 can generally adjust the guide 480 and spacers so that the tool accommodates certain boards, for example 5¾" wide boards that may have variation of an ⅛" to ¼". In applications where a user may want to switch to a different job and install a larger board, for example a 6" composite board, the tool optionally can include a more coarse adjustment mechanism 590, which allows the tool to be used with different width or dimensioned boards.

Figure 32:
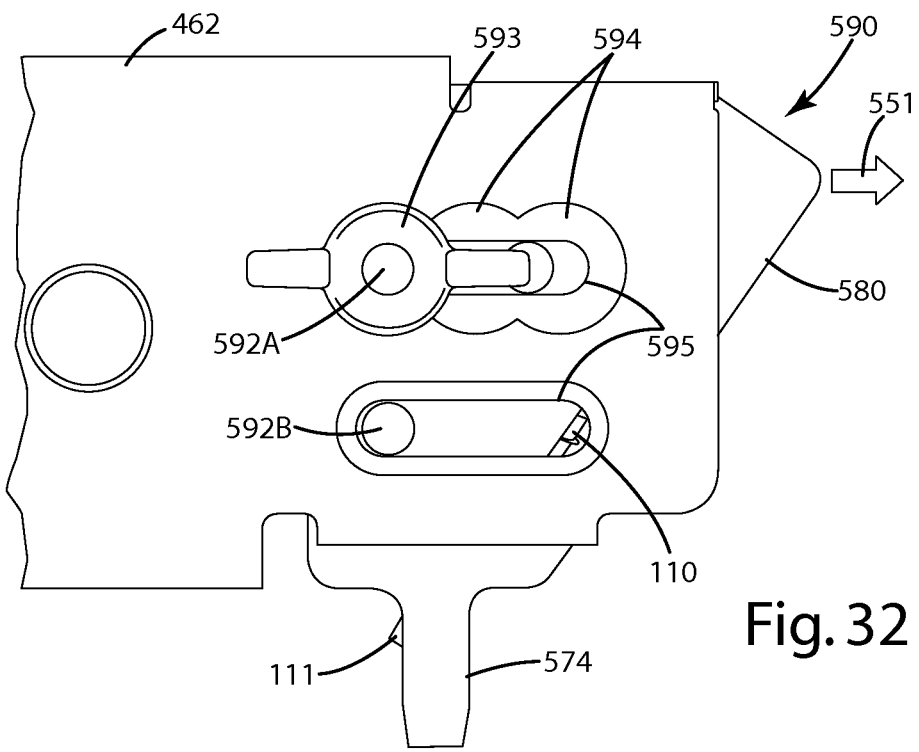
FIG. 32 is a first side view of an adjustment element of the second alternative embodiment of the fastener installation tool.

Referring to FIGS. 29-33, one suitable coarse adjustment mechanism 590 can include a stopper assembly including first and second stopper pins 592A and 592B. The stopper pins can extend through the respective slots 595 defined by the frame 462. One or both of the pins can be threaded. As shown in FIG. 32, the upper stopper pin 592a is threaded and can receive a wing nut 593 to secure the stopper assembly to the frame in a fixed position. The frame itself may define recesses 594 which accommodate the dimensions of the wing nut 593 or whatever other fastener may be used.

Figure 33:
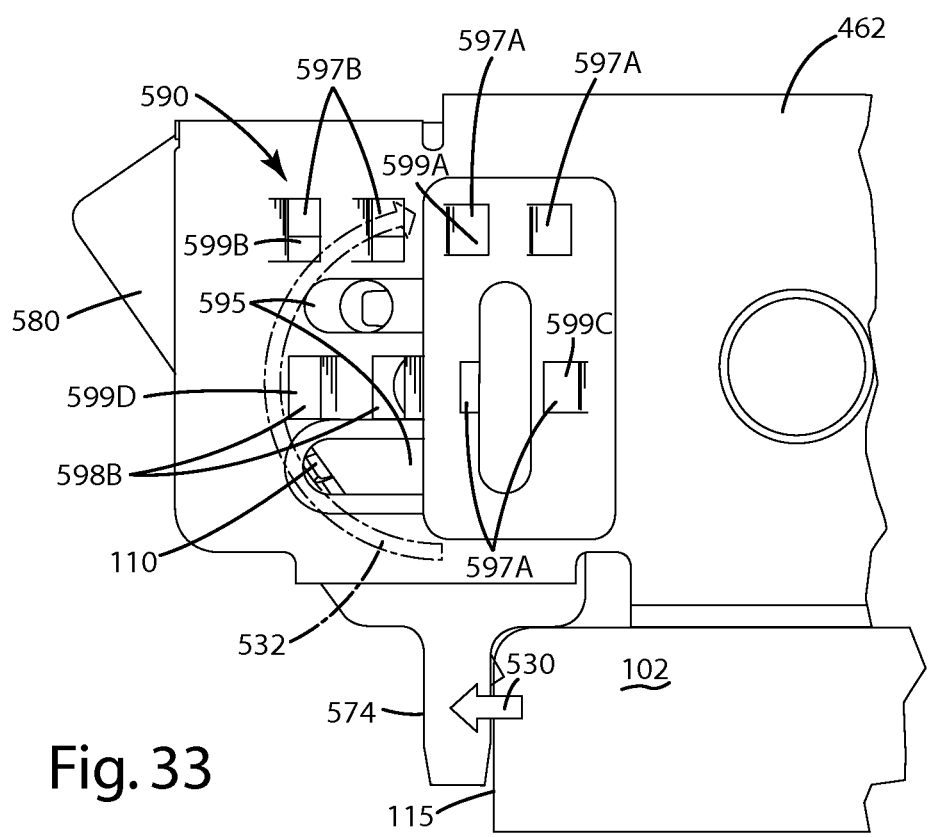
FIG. 33 is another side view of an adjustment element of the second alternative embodiment of the fastener installation tool.

The stopper assembly 590 can be prone to rotation due to forces exerted by a work piece on the tool during installation or a clamping action executed by the tool. For example, as shown in FIG. 33, the work piece 102 can exert a force 530 on the spacer 574 which can urge the spacer to rotate in the direction of the arrow 532 when the tool clamps the work piece 102. If the guide 580 is allowed to rotate significantly, it can misalign the spacer 574 with the side surface 115 of the work piece 102, which in turn can misalign the fastener 110 with the side surface 115 of the work piece. Accordingly, as the fastener 110 is advanced, it can damage the work piece 102 or otherwise bind in the angled bore of the screw guide 580. To counter this possible rotation in the direction of the arrow 532, or other rotation, the stopper assembly can include tabbed detents 597A that interfit within corresponding detents 597B. The angle of the upper detents 597A can be such that the free tabs engage the inner surfaces of the apertures 597B and prevent the stopper from rotating. Likewise, the lower tabs 598A can be angled inward and can be adapted so that the ends 599C of the tabs engage the flat surfaces of the apertures 599D to prevent rotation of the stopper assembly and subsequently to prevent rotation of the guide 580. There are a variety of other constructions that can prevent such rotation. Such constructions may be readily exchanged with the adjustment element 590 described herein.

Although sometimes referred to as boards, the work pieces with which the fasteners and tools herein can be utilized can vary, for example, the work pieces can be composite materials, natural wood, particle board or other suitable building materials.

The above descriptions are those of the preferred embodiments of the invention. Various alterations and changes can be made without departing from the spirit and broader aspects of the invention as defined in the appended claims, which are to be interpreted in accordance with the principles of patent law including the doctrine of equivalents. Any references to claim elements in the singular, for example, using the articles "a," "an," "the," or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

The embodiments of the invention in which an exclusive property or privilege is claimed are defined as follows:

1. A fastener comprising:
a head including a drive feature adapted to be driven by a tool to rotate the fastener;

a shaft joined with and extending away from the head, the shaft terminating at an end, the shaft defining a longitudinal axis;

a primary thread formed along the shaft, the primary thread coiling around the shaft toward the end, the primary thread including a last thread; and a chisel brake point located at the end, the chisel brake point including a first inclined surface and a second inclined surface that begin at a boundary and extend toward a chisel edge, wherein the last thread coils around the end, beyond the boundary toward the chisel edge, wherein the last thread merges with the first inclined surface to form an extension of the first inclined surface, thereby increasing a surface area of the first inclined surface, wherein the last thread includes a lower thread surface that is located within the end, wherein the lower thread surface coils around the shaft and joins with the primary thread so that material scraped at least by the chisel edge, while pre-boring a hole in a work piece with the fastener, is transferred to the last thread, and subsequently fed up the lower thread surface so that the material is moved from a bottom of the pre-bored hole and out of the pre-bored hole.

2. The fastener of claim 1 wherein the last thread terminates at the extension, with no additional thread portions located between the extension and the chisel edge, wherein the last thread does not form an extension of the chisel edge.

3. The fastener of claim 2 wherein the head includes a first portion and a second portion, the second portion being frustoconical and located adjacent the shaft, the first portion being cylindrical, and located distal from the shaft.

4. The fastener of claim 1 wherein the lower thread surface forms a continuous surface that extends continuously along the last thread and the primary thread, and is void of any self tapping grooves or discontinuities.

5. The fastener of claim 1 wherein the last thread includes a leading portion positioned between the boundary and the chisel edge, the leading portion extending outward from the shaft a preselected distance adjacent the first inclined surface, whereby the leading portion is adapted to scoop up the material scraped as the fastener pre-bores the hole in the work piece.

6. The fastener of claim 1 comprising a reverse thread formed on the shaft and separated from the primary thread, the reverse thread having a first outer diameter, the primary thread having a second outer diameter, the first outer diameter less than the second outer diameter.

7. The fastener of claim 1 wherein the first inclined surface and the second inclined surface are at an angle of about 90° to about 150° relative to one another, whereby the angle enables the chisel brake point to selectively retard advancement of the fastener into a work piece.

8. The fastener of claim 7 wherein the last thread terminates where the last thread merges with the first inclined surface at a leading portion within a transition region, wherein no additional thread is located between the chisel edge and the leading portion.

9. A fastener comprising:
a head;
a shaft joined with the head;
a chisel brake point formed at the end of the shaft, the chisel brake point including a first inclined surface and a second inclined surface; and a thread formed on the shaft, the thread beginning adjacent the chisel brake point, the thread coiling continuously around the shaft rearward from the chisel brake point so that material scraped by the chisel brake point, while pre-boring a hole in a work piece with the fastener, is transferred to the thread, and subsequently fed up the thread so that the material is moved from a bottom of the pre-bored hole and out of the pre-bored hole.

10. The fastener of claim 9 wherein the first inclined surface and the second inclined surface are at an angle of about 90° to about 150° relative to one another, whereby the angle enables the chisel brake point to selectively retard advancement of the fastener into a work piece.

11. The fastener of claim 10 wherein the thread includes a leading portion that merges into the shaft adjacent at least one of the first inclined surface and the second inclined surface.

12. The fastener of claim 9,
wherein the thread includes an intersecting portion that merges into the first inclined surface,
wherein the thread includes a leading portion that terminates adjacent and forms an extension of the chisel brake point.

13. The fastener of claim 9,
wherein the thread includes a leading portion that transitions into the first inclined surface at an intersecting portion,
wherein the first inclined surface and intersecting portion lay in a common plane.

14. The fastener of claim 9 wherein the chisel brake point includes a chisel edge that extends linearly across a diameter of the chisel brake point.

15. The fastener of claim 14 wherein the chisel edge includes only the first and second inclined surfaces intersecting one another along the chisel edge.

16. The fastener of claim 9,
wherein the thread includes a leading portion, and upper and lower thread surfaces that merge at a thread crest,
wherein the upper and lower thread surfaces surround part of the leading portion.

17. The fastener of claim 16,
wherein the leading portion extends outward from the first inclined surface forming an extension thereof,
wherein the extension of the first inclined surface terminates at the upper and lower thread surfaces.

18. The fastener of claim 9 wherein the chisel brake point includes a chisel edge having an apex at which first and second chisel subportions intersect.

19. The fastener of claim 18,
wherein the first and second chisel subportions are at an angle of greater than 90° and less than 180° relative to one another,
wherein the thread includes a leading portion that terminates adjacent the first chisel subportion and forms an extension thereof.

20. The fastener of claim 9 wherein the thread includes a leading portion that merges into the first inclined surface at an intersecting portion, the intersecting portion being generally planar an forming extension of the first inclined surface.

* * * * *